US010585175B2

(12) United States Patent
Retterath et al.

(10) Patent No.: US 10,585,175 B2
(45) Date of Patent: *Mar. 10, 2020

(54) METHODS AND APPARATUS FOR OBJECT DETECTION AND IDENTIFICATION IN A MULTIPLE DETECTOR LIDAR ARRAY

(71) Applicant: Big Sky Financial Corporation, Oviedo, FL (US)

(72) Inventors: James E. Retterath, Excelsior, MN (US); Robert A. Laumeyer, Eden Prairie, MN (US)

(73) Assignee: Big Sky Financial Corporation, Oviedo, FL (US)

( * ) Notice: Subject to any disclaimer, the term of this patent is extended or adjusted under 35 U.S.C. 154(b) by 520 days.

This patent is subject to a terminal disclaimer.

(21) Appl. No.: 15/173,969

(22) Filed: Jun. 6, 2016

(65) Prior Publication Data
US 2016/0356881 A1 Dec. 8, 2016

Related U.S. Application Data

(63) Continuation of application No. 14/251,254, filed on Apr. 11, 2014, now Pat. No. 9,360,554.

(51) Int. Cl.
*G01S 7/48* (2006.01)
*G01S 7/4863* (2020.01)
(Continued)

(52) U.S. Cl.
CPC ............ *G01S 7/4863* (2013.01); *G01S 7/481* (2013.01); *G01S 7/4815* (2013.01);
(Continued)

(58) Field of Classification Search
CPC ............ G01C 3/08; G01S 17/93; G01S 17/06
(Continued)

(56) References Cited

U.S. PATENT DOCUMENTS 3,971,065 A 7/1976 Bayer
4,185,891 A 1/1980 Kaestner
(Continued)

FOREIGN PATENT DOCUMENTS

EP 1764835 A1 3/2007
EP 1912078 A1 4/2008
(Continued)

OTHER PUBLICATIONS

Möller et al., "Robust 3D Measurement with PMD Sensors," Proceedings of the First Range Imaging Research Day at ETH Zurich, 2005, 14 pages.
(Continued)

*Primary Examiner* — Luke D Ratcliffe
(74) *Attorney, Agent, or Firm* — Patterson Thuente Pedersen, P.A.

(57) ABSTRACT

LiDAR (light detection and ranging) systems use one or more emitters and a detector array to cover a given field of view where the emitters each emit a single pulse or a multi-pulse packet of light that is sampled by the detector array. On each emitter cycle the detector array will sample the incoming signal intensity at the pre-determined sampling frequency that generates two or more samples per emitted light packet to allow for volumetric analysis of the retroreflected signal portion of each emitted light packet as reflected by one or more objects in the field of view and then received by each detector.

7 Claims, 34 Drawing Sheets

(51) Int. Cl.
  *G01S 17/89* (2020.01)
  *G01S 17/10* (2020.01)
  *G01S 17/42* (2006.01)
  *G01S 17/93* (2020.01)
  *G01S 7/481* (2006.01)
  *G01S 7/4865* (2020.01)
  *G01S 7/497* (2006.01)

(52) U.S. Cl.
  CPC .......... *G01S 7/4817* (2013.01); *G01S 7/4865* (2013.01); *G01S 7/497* (2013.01); *G01S 17/10* (2013.01); *G01S 17/102* (2013.01); *G01S 17/42* (2013.01); *G01S 17/89* (2013.01); *G01S 17/936* (2013.01)

(58) Field of Classification Search
  USPC ............ 356/3.01–5.15, 4.01–4.1, 5.01–5.15, 356/6–22, 28, 28.5
  See application file for complete search history.

(56) References Cited

U.S. PATENT DOCUMENTS

| | | |
|---|---|---|
| 4,739,398 A | 4/1988 | Thomas et al. |
| 4,935,616 A | 6/1990 | Scott |
| 5,006,721 A | 4/1991 | Cameron et al. |
| 5,026,156 A | 6/1991 | Bayston et al. |
| 5,054,911 A | 10/1991 | Ohishi et al. |
| 5,081,530 A | 1/1992 | Medina |
| 5,084,895 A | 1/1992 | Shimada et al. |
| 5,090,245 A | 2/1992 | Anderson |
| 5,122,796 A | 6/1992 | Beggs et al. |
| 5,212,706 A | 5/1993 | Jain |
| 5,400,350 A | 3/1995 | Galvanauskas |
| 5,418,359 A | 5/1995 | Juds et al. |
| 5,420,722 A | 5/1995 | Bielak |
| 5,446,529 A | 8/1995 | Stettner et al. |
| 5,465,142 A | 11/1995 | Krumes et al. |
| 5,485,009 A | 1/1996 | Meyzonnetie et al. |
| 5,497,269 A | 3/1996 | Gal |
| 5,619,317 A | 4/1997 | Oishi et al. |
| 5,675,326 A | 10/1997 | Juds et al. |
| 5,682,229 A | 10/1997 | Wangler |
| 5,793,491 A | 8/1998 | Wangler et al. |
| 5,805,275 A | 9/1998 | Taylor |
| 5,831,551 A | 11/1998 | Geduld |
| 5,870,180 A | 2/1999 | Wangler |
| 5,892,575 A | 4/1999 | Marino |
| 5,940,170 A | 8/1999 | Berg et al. |
| 6,054,927 A | 4/2000 | Brickell |
| 6,057,909 A | 5/2000 | Yahav et al. |
| 6,118,518 A | 9/2000 | Hobbs |
| 6,133,989 A | 10/2000 | Stettner et al. |
| 6,150,956 A | 11/2000 | Laufer |
| 6,181,463 B1 | 1/2001 | Galvanauskas et al. |
| 6,212,480 B1 | 4/2001 | Dunne |
| 6,323,942 B1 | 11/2001 | Bamji |
| 6,327,090 B1 | 12/2001 | Rando et al. |
| 6,370,291 B1 | 4/2002 | Mitchell |
| 6,373,557 B1 | 4/2002 | Megel et al. |
| 6,377,167 B1 | 4/2002 | Juds et al. |
| 6,396,397 B1 | 5/2002 | Bos et al. |
| 6,448,572 B1 | 9/2002 | Tennant et al. |
| 6,456,368 B2 | 9/2002 | Seo |
| 6,480,265 B2 | 11/2002 | Maimon et al. |
| 6,512,892 B1 | 1/2003 | Montgomery et al. |
| 6,522,396 B1 | 2/2003 | Halmos |
| 6,535,275 B2 | 3/2003 | McCaffrey et al. |
| 6,619,406 B1 | 9/2003 | Kacyra et al. |
| 6,646,725 B1 | 11/2003 | Eichinger et al. |
| 6,654,401 B2 | 11/2003 | Cavalheiro Vieira et al. |
| 6,665,055 B2 | 12/2003 | Ohishi et al. |
| 6,674,878 B2 | 1/2004 | Retterath et al. |
| 6,683,727 B1 | 1/2004 | Göring et al. |
| 6,711,280 B2 | 3/2004 | Stafsudd et al. |
| 6,717,972 B2 | 4/2004 | Steinle et al. |
| 6,774,988 B2 | 8/2004 | Stam et al. |
| 6,828,558 B1 | 12/2004 | Arnone et al. |
| 6,843,416 B2 | 1/2005 | Swartz et al. |
| 6,873,640 B2 | 3/2005 | Bradburn et al. |
| 6,881,979 B2 | 4/2005 | Starikov et al. |
| 6,906,302 B2 | 6/2005 | Drowley |
| 6,967,569 B2 | 11/2005 | Weber et al. |
| 6,975,251 B2 | 12/2005 | Pavicic |
| 6,987,447 B2 | 1/2006 | Baerenweiler et al. |
| 7,016,519 B1 | 3/2006 | Nakamura et al. |
| 7,148,974 B1 | 12/2006 | Schmitt et al. |
| 7,149,613 B2 | 12/2006 | Stam et al. |
| 7,171,037 B2 | 1/2007 | Mahon et al. |
| 7,224,384 B1 | 5/2007 | Iddan et al. |
| 7,227,459 B2 | 6/2007 | Bos et al. |
| 7,236,235 B2 | 6/2007 | Dimsdale |
| 7,248,342 B1 | 7/2007 | Degnan |
| 7,248,344 B2 | 7/2007 | Morcom |
| 7,294,863 B2 | 11/2007 | Lee et al. |
| 7,319,777 B2 | 1/2008 | Morcom |
| 7,348,919 B2 | 3/2008 | Gounalis |
| 7,362,419 B2 | 4/2008 | Kurihara et al. |
| 7,436,494 B1 | 10/2008 | Kennedy et al. |
| 7,453,553 B2 | 11/2008 | Dimsdale |
| 7,474,821 B2 | 1/2009 | Donlagic et al. |
| 7,521,666 B2 | 4/2009 | Tsang |
| 7,534,984 B2 | 5/2009 | Gleckler |
| 7,542,499 B2 | 6/2009 | Jikutani |
| 7,544,945 B2 | 6/2009 | Tan et al. |
| 7,551,771 B2 | 6/2009 | England, III |
| 7,560,680 B2 | 7/2009 | Sato et al. |
| 7,579,593 B2 | 8/2009 | Onozawa et al. |
| 7,607,509 B2 | 10/2009 | Schmiz et al. |
| 7,623,248 B2 | 11/2009 | Laflamme |
| 7,649,654 B2 | 1/2010 | Shyu et al. |
| 7,663,095 B2 | 2/2010 | Wong et al. |
| 7,689,032 B2 | 3/2010 | Strassenburg-Kleciak |
| 7,697,119 B2 | 4/2010 | Ikeno et al. |
| 7,733,932 B2 | 6/2010 | Faybishenko |
| 7,755,743 B2 | 7/2010 | Kumahara et al. |
| 7,755,809 B2 | 7/2010 | Fujita et al. |
| 7,787,105 B2 | 8/2010 | Hipp |
| 7,787,511 B2 | 8/2010 | Jikutani et al. |
| 7,830,442 B2 | 11/2010 | Griffis et al. |
| 7,830,532 B2 | 11/2010 | De Coi |
| 7,873,091 B2 | 1/2011 | Parent et al. |
| 7,881,355 B2 | 2/2011 | Sipes, Jr. |
| 7,888,159 B2 | 2/2011 | Venezia et al. |
| 7,894,725 B2 | 2/2011 | Holman et al. |
| 7,900,736 B2 | 3/2011 | Breed |
| 7,911,617 B2 | 3/2011 | Padmanabhan et al. |
| 7,940,825 B2 | 5/2011 | Jikutani |
| 7,944,548 B2 * | 5/2011 | Eaton ................... G01C 11/025 356/5.01 |
| 7,945,408 B2 | 5/2011 | Dimsdale et al. |
| 7,957,448 B2 | 6/2011 | Willemin et al. |
| 7,957,639 B2 | 6/2011 | Lee et al. |
| 7,960,195 B2 | 6/2011 | Maeda et al. |
| 7,961,328 B2 | 6/2011 | Austin et al. |
| 7,969,558 B2 | 6/2011 | Hall |
| 7,979,173 B2 | 7/2011 | Breed |
| 7,983,817 B2 | 7/2011 | Breed |
| 7,986,461 B2 | 7/2011 | Bartoschewski |
| 7,991,222 B2 | 8/2011 | Dimsdale et al. |
| 7,994,465 B1 | 8/2011 | Bamji et al. |
| 8,027,029 B2 | 9/2011 | Lu et al. |
| 8,045,595 B2 | 10/2011 | Ma |
| 8,054,203 B2 | 11/2011 | Breed et al. |
| 8,054,464 B2 | 11/2011 | Mathur et al. |
| 8,072,581 B1 | 12/2011 | Breiholz |
| 8,072,663 B2 | 12/2011 | O'Neill et al. |
| 8,077,294 B1 | 12/2011 | Grund et al. |
| 8,089,498 B2 | 1/2012 | Sato et al. |
| 8,094,060 B2 | 1/2012 | Beard et al. |
| 8,098,969 B2 | 1/2012 | Tolstikhin et al. |
| 8,102,426 B2 | 1/2012 | Yahav et al. |
| 8,111,452 B2 | 2/2012 | Butler et al. |
| 8,115,158 B2 | 2/2012 | Buettgen |

(56) References Cited

U.S. PATENT DOCUMENTS

| | | |
|---|---|---|
| 8,120,754 B2 | 2/2012 | Kaehler |
| 8,125,367 B2 | 2/2012 | Ludwig |
| 8,125,620 B2 | 2/2012 | Lewis |
| 8,139,141 B2 | 3/2012 | Bamji et al. |
| 8,159,598 B2 | 4/2012 | Watanabe et al. |
| 8,194,712 B2 | 6/2012 | Müller et al. |
| 8,198,576 B2 | 6/2012 | Kennedy et al. |
| 8,199,786 B2 | 6/2012 | Gaillard et al. |
| 8,212,998 B2 | 7/2012 | Rindle |
| 8,213,479 B2 | 7/2012 | Doerfel et al. |
| 8,229,663 B2 | 7/2012 | Zeng et al. |
| 8,235,416 B2 | 8/2012 | Breed et al. |
| 8,235,605 B2 | 8/2012 | Kim |
| 8,238,393 B2 | 8/2012 | Iwasaki |
| 8,242,428 B2 | 8/2012 | Meyers et al. |
| 8,242,476 B2 | 8/2012 | Memeault et al. |
| 8,249,798 B2 | 8/2012 | Hawes et al. |
| 8,259,003 B2 | 9/2012 | Song |
| 8,280,623 B2 | 10/2012 | Trepagnier et al. |
| 8,301,027 B2 | 10/2012 | Shaw et al. |
| 8,310,654 B2 | 11/2012 | Weilkes et al. |
| 8,319,949 B2 | 11/2012 | Cantin et al. |
| 8,325,256 B2 | 12/2012 | Egawa |
| 8,338,900 B2 | 12/2012 | Venezia et al. |
| 8,340,151 B2 | 12/2012 | Liu et al. |
| 8,354,928 B2 | 1/2013 | Morcom |
| 8,355,117 B2 | 1/2013 | Niclass |
| 8,363,156 B2 | 1/2013 | Lo |
| 8,363,511 B2 | 1/2013 | Frank et al. |
| 8,364,334 B2 | 1/2013 | Au et al. |
| 8,368,005 B2 | 2/2013 | Wang et al. |
| 8,368,876 B1 | 2/2013 | Johnson et al. |
| 8,378,287 B2 | 2/2013 | Schemmann et al. |
| 8,378,885 B2 | 2/2013 | Comic et al. |
| 8,380,367 B2 | 2/2013 | Schultz et al. |
| 8,391,336 B2 | 3/2013 | Chiskis |
| 8,401,046 B2 | 3/2013 | Shveykin et al. |
| 8,401,049 B2 | 3/2013 | Sato et al. |
| 8,422,148 B2 | 4/2013 | Langer et al. |
| 8,426,797 B2 | 4/2013 | Aull et al. |
| 8,437,584 B2 | 5/2013 | Matsuoka et al. |
| 8,442,084 B2 | 5/2013 | Ungar |
| 8,446,470 B2 | 5/2013 | Lu et al. |
| 8,451,432 B2 | 5/2013 | Crawford et al. |
| 8,451,871 B2 | 5/2013 | Yankov |
| 8,456,517 B2 | 6/2013 | Spektor et al. |
| 8,477,819 B2 | 7/2013 | Kitamura |
| 8,487,525 B2 | 7/2013 | Lee |
| 8,494,687 B2 | 7/2013 | Vanek et al. |
| 8,503,888 B2 | 8/2013 | Takemoto et al. |
| 8,508,567 B2 | 8/2013 | Sato et al. |
| 8,508,720 B2 | 8/2013 | Kamiyama |
| 8,508,721 B2 | 8/2013 | Cates et al. |
| 8,520,713 B2 | 8/2013 | Joseph |
| 8,531,650 B2 | 9/2013 | Feldkhun et al. |
| 8,538,636 B2 | 9/2013 | Breed |
| 8,558,993 B2 | 10/2013 | Newbury et al. |
| 8,570,372 B2 | 10/2013 | Russell |
| 8,587,637 B1 | 11/2013 | Cryder et al. |
| 8,594,455 B2 | 11/2013 | Meyers et al. |
| 8,599,363 B2 | 12/2013 | Zeng |
| 8,599,367 B2 | 12/2013 | Canham |
| 8,604,932 B2 | 12/2013 | Breed et al. |
| 8,605,262 B2 | 12/2013 | Campbell et al. |
| 8,619,241 B2 | 12/2013 | Mimeault |
| 8,633,989 B2 | 1/2014 | Okuda |
| 8,640,182 B2 | 1/2014 | Bedingfield, Sr. |
| 8,655,513 B2 | 2/2014 | Vanek |
| 8,675,184 B2 | 3/2014 | Schmitt et al. |
| 8,681,255 B2 | 3/2014 | Katz et al. |
| 8,687,172 B2 | 4/2014 | Faul et al. |
| 8,717,417 B2 | 5/2014 | Sali et al. |
| 8,717,492 B2 | 5/2014 | McMackin et al. |
| 8,723,689 B2 | 5/2014 | Mimeault |
| 8,724,671 B2 | 5/2014 | Moore |
| 8,736,670 B2 | 5/2014 | Barbour et al. |
| 8,736,818 B2 | 5/2014 | Weimer et al. |
| 8,742,325 B1 | 6/2014 | Droz et al. |
| 8,743,455 B2 | 6/2014 | Gusev et al. |
| 8,754,829 B2 | 6/2014 | Lapstun |
| 8,760,499 B2 | 6/2014 | Russell |
| 8,767,190 B2 | 7/2014 | Hall |
| 8,773,642 B2 | 7/2014 | Eisele et al. |
| 8,781,790 B2 | 7/2014 | Zhu et al. |
| 8,797,550 B2 | 8/2014 | Hays et al. |
| 8,804,101 B2 | 8/2014 | Spagnolia et al. |
| 8,809,758 B2 | 8/2014 | Molnar et al. |
| 8,810,647 B2 | 8/2014 | Niclass et al. |
| 8,810,796 B2 | 8/2014 | Hays et al. |
| 8,811,720 B2 | 8/2014 | Seida |
| 8,820,782 B2 | 9/2014 | Breed et al. |
| 8,836,921 B2 | 9/2014 | Feldkhun et al. |
| 8,836,922 B1 * | 9/2014 | Pennecot ............. G01S 17/89 356/4.01 |
| 8,854,426 B2 | 10/2014 | Pellman et al. |
| 8,855,849 B1 | 10/2014 | Ferguson et al. |
| 8,864,655 B2 | 10/2014 | Ramamurthy et al. |
| 8,885,152 B1 | 11/2014 | Wright |
| 8,908,157 B2 | 12/2014 | Eisele et al. |
| 8,908,159 B2 | 12/2014 | Mimeault |
| 8,918,831 B2 | 12/2014 | Meuninck et al. |
| 8,928,865 B2 | 1/2015 | Rakuljic |
| 8,933,862 B2 | 1/2015 | Lapstun |
| 8,934,087 B1 | 1/2015 | Stobie et al. |
| 8,947,647 B2 | 2/2015 | Halmos et al. |
| 8,963,956 B2 | 2/2015 | Latta et al. |
| 8,988,754 B2 | 3/2015 | Sun et al. |
| 8,995,577 B2 | 3/2015 | Ullrich et al. |
| 9,032,470 B2 | 5/2015 | Meuninck et al. |
| 9,066,087 B2 | 6/2015 | Shpunt |
| 9,069,060 B1 | 6/2015 | Zbrozek et al. |
| 9,098,931 B2 | 8/2015 | Shpunt et al. |
| 9,102,220 B2 | 8/2015 | Breed |
| 9,103,715 B1 | 8/2015 | Demers et al. |
| 9,113,155 B2 | 8/2015 | Wu et al. |
| 9,119,670 B2 | 9/2015 | Yang et al. |
| 9,131,136 B2 | 9/2015 | Shpunt et al. |
| 9,137,463 B2 | 9/2015 | Gilboa et al. |
| 9,137,511 B1 | 9/2015 | LeGrand, III et al. |
| 9,142,019 B2 | 9/2015 | Lee |
| 9,158,375 B2 | 10/2015 | Maizels et al. |
| 9,185,391 B1 | 11/2015 | Prechtl |
| 9,186,046 B2 | 11/2015 | Ramamurthy et al. |
| 9,186,047 B2 | 11/2015 | Ramamurthy et al. |
| 9,191,582 B1 | 11/2015 | Wright et al. |
| 9,201,501 B2 | 12/2015 | Maizels et al. |
| 9,204,121 B1 | 12/2015 | Marason et al. |
| 9,228,697 B2 | 1/2016 | Schneider et al. |
| 9,237,333 B2 | 1/2016 | Lee et al. |
| 9,239,264 B1 | 1/2016 | Demers |
| 9,360,554 B2 | 6/2016 | Retterath et al. |
| 9,612,153 B2 | 4/2017 | Kawada et al. |
| 9,723,233 B2 | 8/2017 | Grauer et al. |
| 9,866,816 B2 | 1/2018 | Retterath |
| 10,036,801 B2 | 7/2018 | Retterath et al. |
| 10,203,399 B2 | 2/2019 | Retterath et al. |
| 2002/0179708 A1 | 12/2002 | Zhu et al. |
| 2003/0043364 A1 | 3/2003 | Jamieson et al. |
| 2003/0085867 A1 | 5/2003 | Grabert |
| 2003/0155513 A1 | 8/2003 | Remillard et al. |
| 2004/0133380 A1 | 7/2004 | Gounalis |
| 2006/0132752 A1 | 6/2006 | Kane |
| 2006/0157643 A1 | 7/2006 | Bamji et al. |
| 2006/0268265 A1 | 11/2006 | Chuang et al. |
| 2006/0279630 A1 | 12/2006 | Aggarwal |
| 2007/0182949 A1 | 8/2007 | Niclass |
| 2007/0279615 A1 | 12/2007 | Degnan et al. |
| 2008/0180650 A1 | 7/2008 | Lamesch |
| 2009/0045359 A1 | 2/2009 | Kumahara et al. |
| 2009/0076758 A1 | 3/2009 | Dimsdale |
| 2009/0128802 A1 | 5/2009 | Treado et al. |
| 2009/0232355 A1 | 9/2009 | Minear et al. |
| 2010/0020306 A1 | 1/2010 | Hall |
| 2010/0045966 A1 | 2/2010 | Cauquy et al. |

(56) References Cited

U.S. PATENT DOCUMENTS

| | | |
|---|---|---|
| 2010/0128109 A1 | 5/2010 | Banks |
| 2010/0231891 A1 | 9/2010 | Mase et al. |
| 2010/0265386 A1 | 10/2010 | Raskar et al. |
| 2010/0277713 A1 | 11/2010 | Mimeault |
| 2010/0301195 A1 | 12/2010 | Thor et al. |
| 2011/0007299 A1 | 1/2011 | Moench et al. |
| 2011/0037849 A1 | 2/2011 | Niclass et al. |
| 2011/0101206 A1 | 5/2011 | Buettgen |
| 2011/0131722 A1 | 6/2011 | Scott et al. |
| 2011/0134220 A1 | 6/2011 | Barbour et al. |
| 2011/0216304 A1 | 9/2011 | Hall |
| 2011/0285980 A1 | 11/2011 | Newbury et al. |
| 2011/0285981 A1 | 11/2011 | Justice et al. |
| 2011/0285982 A1 | 11/2011 | Breed |
| 2011/0295469 A1 | 12/2011 | Rafii et al. |
| 2011/0313722 A1 | 12/2011 | Zhu et al. |
| 2012/0001463 A1 | 1/2012 | Breed et al. |
| 2012/0002007 A1 | 1/2012 | Meuninck et al. |
| 2012/0002025 A1 | 1/2012 | Bedingfield, Sr. |
| 2012/0011546 A1 | 1/2012 | Meuninck et al. |
| 2012/0023518 A1 | 1/2012 | Meuninck et al. |
| 2012/0023540 A1 | 1/2012 | Meuninck et al. |
| 2012/0062705 A1 | 3/2012 | Ovsiannikov et al. |
| 2012/0086781 A1 | 4/2012 | Iddan et al. |
| 2012/0098964 A1 | 4/2012 | Oggier et al. |
| 2012/0154784 A1 | 6/2012 | Kaufman et al. |
| 2012/0154785 A1 | 6/2012 | Gilliland et al. |
| 2012/0249998 A1 | 10/2012 | Eisele et al. |
| 2012/0261516 A1 | 10/2012 | Gilliland et al. |
| 2012/0262696 A1 | 10/2012 | Eisele et al. |
| 2012/0274745 A1 | 11/2012 | Russell |
| 2012/0287417 A1 | 11/2012 | Mimeault |
| 2012/0299344 A1 | 11/2012 | Breed et al. |
| 2013/0044129 A1 | 2/2013 | Latta et al. |
| 2013/0060146 A1 | 3/2013 | Yang et al. |
| 2013/0070239 A1 | 3/2013 | Crawford et al. |
| 2013/0076861 A1 | 3/2013 | Sternklar |
| 2013/0083310 A1 | 4/2013 | Ramamurthy et al. |
| 2013/0085330 A1 | 4/2013 | Ramamurthy et al. |
| 2013/0085331 A1 | 4/2013 | Ramamurthy et al. |
| 2013/0085333 A1 | 4/2013 | Ramamurthy et al. |
| 2013/0085334 A1 | 4/2013 | Ramamurthy et al. |
| 2013/0085382 A1 | 4/2013 | Ramamurthy et al. |
| 2013/0085397 A1 | 4/2013 | Ramamurthy et al. |
| 2013/0090528 A1 | 4/2013 | Ramamurthy et al. |
| 2013/0090530 A1 | 4/2013 | Ramamurthy et al. |
| 2013/0090552 A1 | 4/2013 | Ramamurthy et al. |
| 2013/0100249 A1 | 4/2013 | Norita |
| 2013/0188043 A1 | 7/2013 | Decoster |
| 2013/0201288 A1 | 8/2013 | Billerbeck et al. |
| 2013/0215235 A1 | 8/2013 | Russell |
| 2013/0242283 A1 | 9/2013 | Bailey et al. |
| 2013/0242285 A1 | 9/2013 | Zeng |
| 2013/0278917 A1 | 10/2013 | Korekado et al. |
| 2013/0300740 A1* | 11/2013 | Snyder .............. G06F 3/016 345/420 |
| 2013/0300838 A1* | 11/2013 | Borowski ............ G01S 7/486 348/46 |
| 2013/0300840 A1 | 11/2013 | Borowski |
| 2013/0321791 A1 | 12/2013 | Feldkhun et al. |
| 2014/0035959 A1 | 2/2014 | Lapstun |
| 2014/0152971 A1 | 6/2014 | James |
| 2014/0152975 A1 | 6/2014 | Ko |
| 2014/0160461 A1 | 6/2014 | Van Der Tempel et al. |
| 2014/0168362 A1 | 6/2014 | Hannuksela et al. |
| 2014/0211194 A1 | 7/2014 | Pacala et al. |
| 2014/0218473 A1 | 8/2014 | Hannuksela et al. |
| 2014/0240464 A1 | 8/2014 | Lee |
| 2014/0240469 A1 | 8/2014 | Lee |
| 2014/0240809 A1 | 8/2014 | Lapstun |
| 2014/0241614 A1 | 8/2014 | Lee |
| 2014/0253993 A1 | 9/2014 | Lapstun |
| 2014/0292620 A1 | 10/2014 | Lapstun |
| 2014/0313339 A1 | 10/2014 | Diessner |
| 2014/0313376 A1 | 10/2014 | Van Nieuwenhove et al. |
| 2014/0340487 A1 | 11/2014 | Gilliland et al. |
| 2014/0347676 A1 | 11/2014 | Velten et al. |
| 2014/0350836 A1 | 11/2014 | Stettner et al. |
| 2015/0002734 A1 | 1/2015 | Lee |
| 2015/0060673 A1 | 3/2015 | Zimdars |
| 2015/0077764 A1 | 3/2015 | Braker et al. |
| 2015/0082353 A1 | 3/2015 | Meuninck et al. |
| 2015/0116528 A1 | 4/2015 | Lapstun |
| 2015/0131080 A1 | 5/2015 | Retterath et al. |
| 2015/0145955 A1 | 5/2015 | Russell |
| 2015/0192677 A1 | 7/2015 | Yu et al. |
| 2015/0201176 A1 | 7/2015 | Graziosi et al. |
| 2015/0213576 A1 | 7/2015 | Meuninck et al. |
| 2015/0245017 A1 | 8/2015 | Di Censo |
| 2015/0256767 A1 | 9/2015 | Schlechter |
| 2015/0269736 A1 | 9/2015 | Hannuksela et al. |
| 2015/0292874 A1 | 10/2015 | Shpunt et al. |
| 2015/0293226 A1 | 10/2015 | Eisele et al. |
| 2015/0293228 A1 | 10/2015 | Retterath et al. |
| 2015/0296201 A1 | 10/2015 | Banks |
| 2015/0304534 A1 | 10/2015 | Kadambi et al. |
| 2015/0304665 A1 | 10/2015 | Hannuksela et al. |
| 2015/0309154 A1 | 10/2015 | Lohbihler |
| 2015/0319344 A1 | 11/2015 | Lapstun |
| 2015/0319355 A1 | 11/2015 | Lapstun |
| 2015/0319419 A1 | 11/2015 | Akin et al. |
| 2015/0319429 A1 | 11/2015 | Lapstun |
| 2015/0319430 A1 | 11/2015 | Lapstun |
| 2015/0378241 A1 | 12/2015 | Eldada |
| 2015/0379362 A1 | 12/2015 | Calmes et al. |
| 2016/0003946 A1 | 1/2016 | Gilliland et al. |
| 2016/0007009 A1 | 1/2016 | Offenberg |
| 2016/0047901 A1 | 2/2016 | Pacala et al. |
| 2016/0049765 A1 | 2/2016 | Eldada |
| 2016/0161600 A1 | 6/2016 | Eldada et al. |
| 2016/0259038 A1 | 9/2016 | Retterath et al. |
| 2017/0084176 A1 | 3/2017 | Nakamura |
| 2017/0103271 A1 | 4/2017 | Kawagoe |
| 2017/0176578 A1 | 6/2017 | Rae et al. |
| 2017/0257617 A1 | 9/2017 | Retterath |
| 2017/0259753 A1 | 9/2017 | Meyhofer |
| 2018/0131924 A1 | 5/2018 | Jung |
| 2018/0295344 A1 | 10/2018 | Retterath |

FOREIGN PATENT DOCUMENTS

| | | |
|---|---|---|
| WO | WO 1998/010255 A1 | 3/1998 |
| WO | WO 2013/081984 A1 | 6/2013 |
| WO | WO 2013/127975 A1 | 9/2013 |

OTHER PUBLICATIONS

Hussmann et al., "A Performance of 3D TOF Vision Systems in Comparison to Stereo Vision Systems," Stereo Vision, 2008, 20 pages.

Al-Khafaji et al., "Spectral-Spatial Scale Invariant Feature Transform for Hyperspectral Images," IEEE Transactions on Image Processing, vol. 27, Issue 2, Feb. 2018, 14 pages.

Ling et al., "Deformation Invariant Image Matching," Center for Automation Research, Computer Science Department, University of Maryland, College Park, 2005, 8 pages.

Lindeberg, "Scale Invariant Feature Transform," Scholarpedia, 7(5):10491, May 2012, 19 pages.

Application and File history for U.S. Appl. No. 15/853,222, filed Dec. 22, 2017. Inventors: Retterath.

Application and File history for U.S. Appl. No. 16/167,196, filed Oct. 22, 2018. Inventors: Retterath.

Harvey-Lynch, Inc., "Multibeam and Mobile LIDAR Solutions," 2014, 2 pages.

Krill et al., "Multifunction Array LIDAR Network for Intruder Detection, Tracking, and Identification," IEEE ISSNIP, 2010, pp. 43-48.

Levinson et al., "Unsupervised Calibration for Multi-Beam Lasers," Stanford Artificial Intelligence Laboratory, 2010, 8 pages.

Webpage http://www.geforce.com/hardware/desktop-gpus/geforce-gtx-titan/specifications, Jul. 2015, 2 pages.

(56) References Cited

OTHER PUBLICATIONS

Webpage, 3D LADAR & LIDAR Focal Planes and Instruments, Voxtelopto, 2007-2015, 3 pages.
ASC 3D Bringing 3D Alive!, Advanced Scientific Concepts, Inc., Feb. 9, 2010, 14 pages.
Albota et al., "Three-Dimensional Imaging Laser Radar with a Photo-Counting Avalanch Photodiode Array and Microchip Laser," Dec. 20, 2002, 8 pages.
Brazzel et al., "FLASH LIDAR Based Relative Navigation," 2015 IEEE Aerospace Conference, 2014, 11 pages.
Love et al., "Active Probing of Cloud Multiple Scattering, Optical, Depth, Vertical Thickness, and Liquid Water Content Using Wide-Angle Imaging LIDAR," 2002, 11 pages.
Itzler, "Focal-Plane Arrays: Geiger-Mode Focal Plane Arrays Enable SWIR 3D Imaging," 2011, 8 pages.
Superior Signal-to-Noise Ratio of a New AA1 Sequence for Random-Modulation Continuous-Wave LIDAR, Optics Letters, 2004, vol. 29, No. 15.
Frequency-Modulated Continuous-Wave LIDAR Using I/Q Modulator for Simplified Heterodyne Detection, Optics Letters, 2012, vol. 37, No. 11.
Application No. PCT/US2015/022248, filed Mar. 24, 2015, Search Report/Written Opinion dated Jun. 26, 2015, 14 pages.
Application No. PCT/US2014/064123, filed Nov. 5, 2014, Search Report/Written Opinion dated Sep. 10, 2015, 14 pages.
Application No. PCT/US2016/018872, filed Feb. 22, 2016, Search Report/Written Opinion dated Nov. 15, 2016, 8 pages.
Application and File history for U.S. Appl. No. 15/059,811, filed Mar. 3, 2016. Inventors: Retterath.
Application and File history for U.S. Appl. No. 14/078,001, filed Nov. 12, 2013. Inventors: Retterath et al.
Application and File history for U.S. Appl. No. 14/251,254, filed Apr. 11, 2014. Inventors: Retterath et al.
Application and File history for U.S. Appl. No. 14/639,802, filed Mar. 5, 2015. Inventors: Retterath et al.
Application No. PCT/US2017/019852, Search Report/Written Opinion dated May 10, 2017, 10 pages.

\* cited by examiner (Not Drawn to Scale)

FIG. 8

(Prior Art)

| | | |
|---|---|---|
| point p | | |
| | angle | |
| | time | |
| | # of returns | |
| | | return0_intensity |
| | | return0_distance |
| | | return1_intensity |
| | | return1_distance |
| | | return2_intensity |
| | | return2_distance |
| point p+1 | | |
| | angle | |
| | time | |
| | # of returns | |
| | | return0_intensity |
| | | return0_distance |
| | | return1_intensity |
| | | return1_distance |
| point p+2 | | |
| | angle | |
| | time | |
| | # of returns | |
| | | return0_intensity |
| | | return0_distance |
| | | return1_intensity |
| | | return1_distance |
| | | return2_intensity |
| | | return2_distance |
| | | return3_intensity |
| | | return3_distance |

70 — table
72 — point p
74 — angle
76 — time
78 — # of returns
80 — return0_intensity
82 — return0_distance

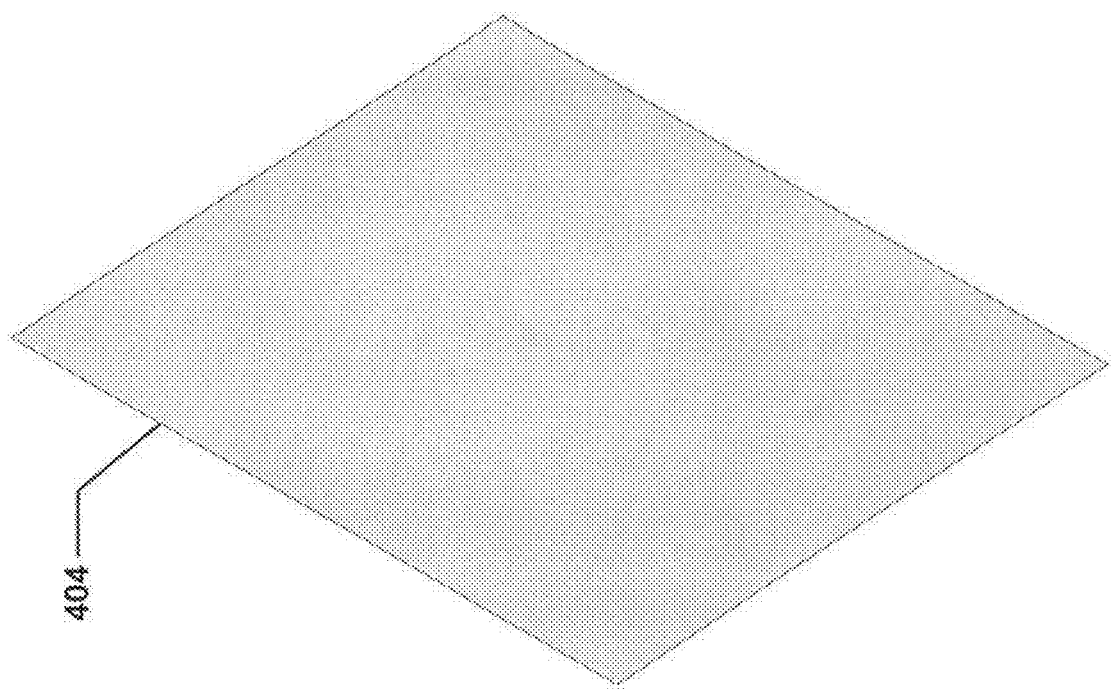
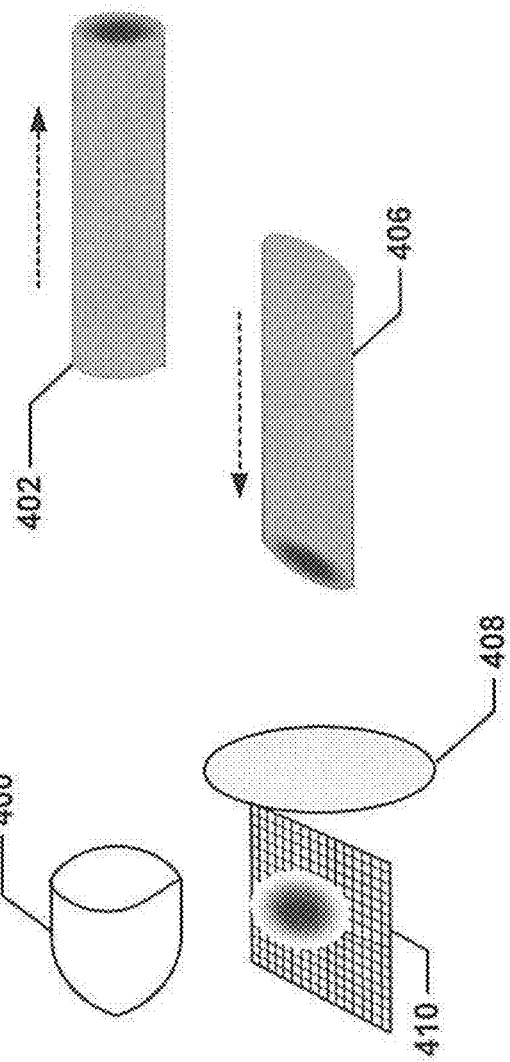
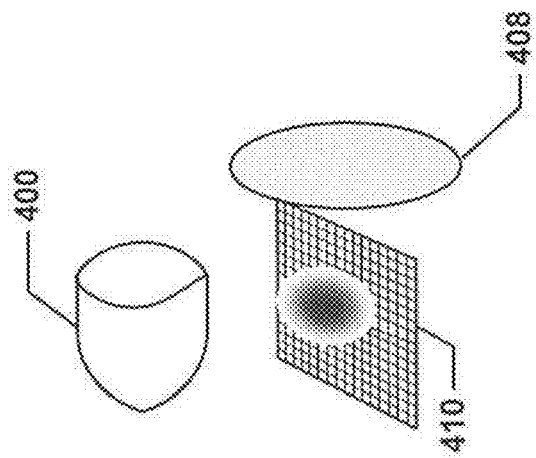
FIG. 9 (Prior Art)

FIG. 15
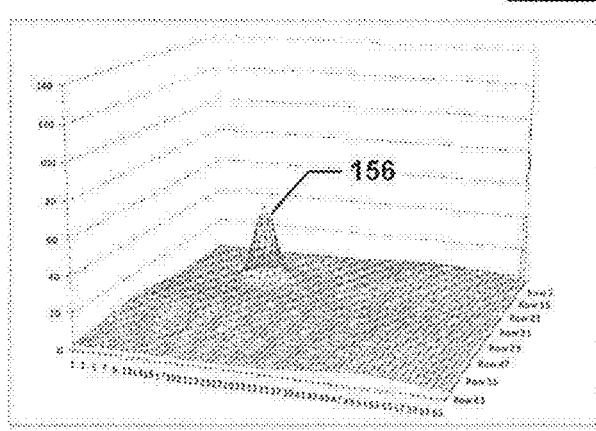
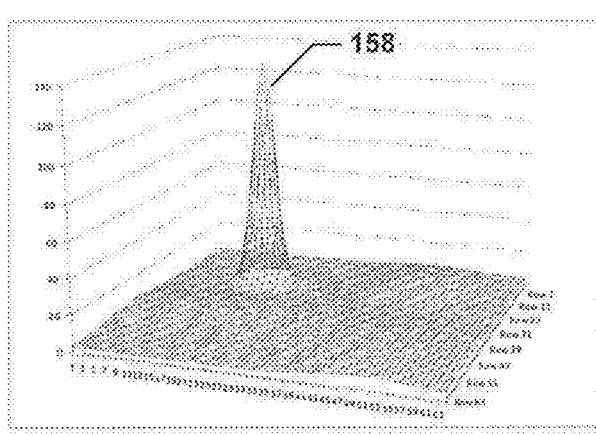
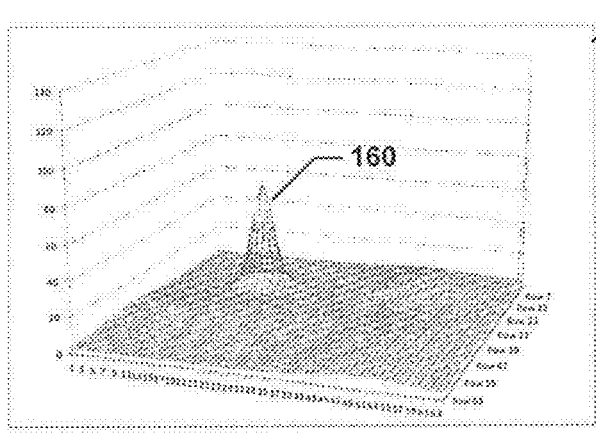

FIG. 17
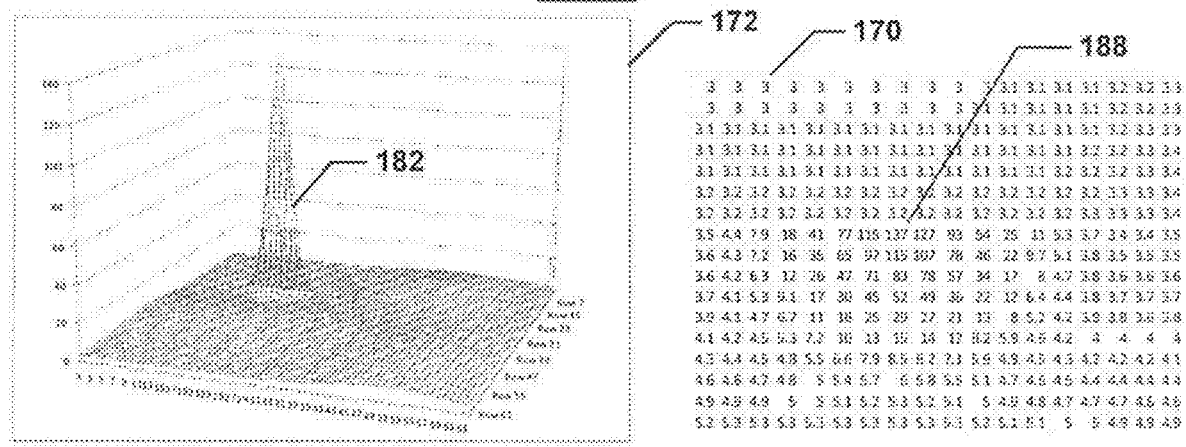
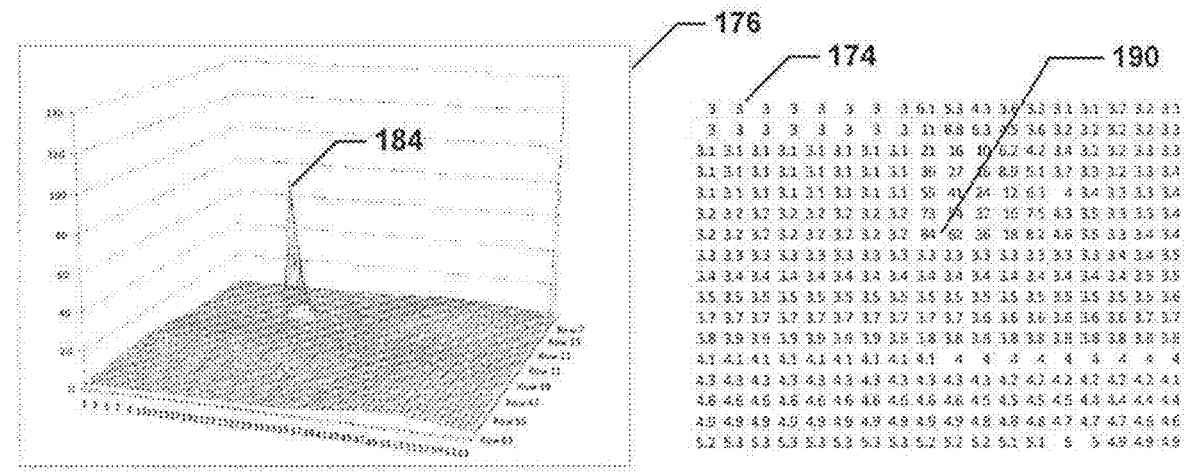
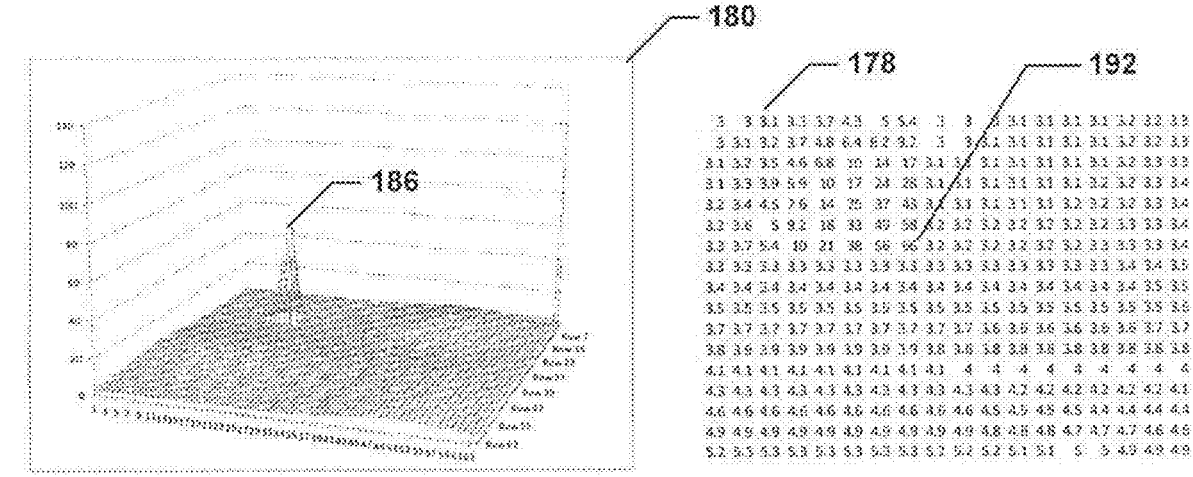

FIG. 19

| point p | |
| --- | --- |
| | angle |
| | distance |
| | intensity |
| | time |
| point p+1 | |
| | angle |
| | distance |
| | intensity |
| | time |
| point p+2 | |
| | angle |
| | distance |
| | intensity |
| | time |
| point p+3 | |
| | angle |
| | distance |
| | intensity |
| | time |
| point p+4 | |
| | angle |
| | distance |
| | intensity |
| | time |
| point p+5 | |
| | angle |
| | distance |
| | intensity |
| | time |
| point p+6 | |
| | angle |
| | distance |
| | intensity |
| | time |
| point p+7 | |
| | angle |
| | distance |
| | intensity |
| | time |
| point p+8 | |
| | angle |
| | distance |
| | intensity |
| | time |

FIG. 21

| | | |
|---|---|---|
| feature f | | |
| | feature type | <point> |
| | proj_angle | |
| | distance | |
| | intensity | |
| | time | |
| feature f+1 | | |
| | feature type | <point> |
| | proj_angle | |
| | distance | |
| | intensity | |
| | time | |
| feature f+2 | | |
| | feature type | <point> |
| | proj_angle | |
| | distance | |
| | intensity | |
| | time | |
| feature f+3 | | |
| | feature type | <edge> |
| | proj_angle | |
| | distance | |
| | time | |
| | edge_angle | |
| feature f+4 | | |
| | feature type | <corner> |
| | proj_angle | |
| | distance | |
| | time | |
| | edge_angle0 | |
| | edge_angle1 | |

FIG. 24
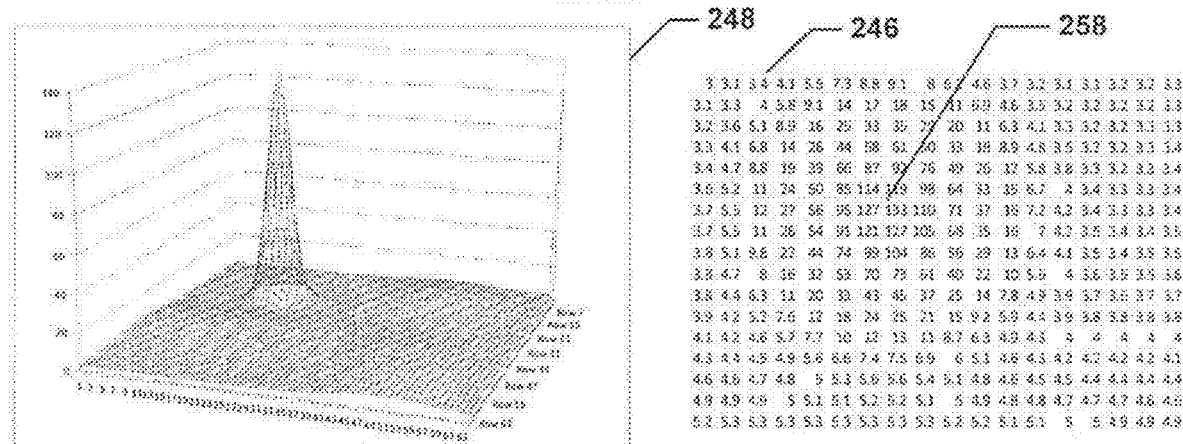
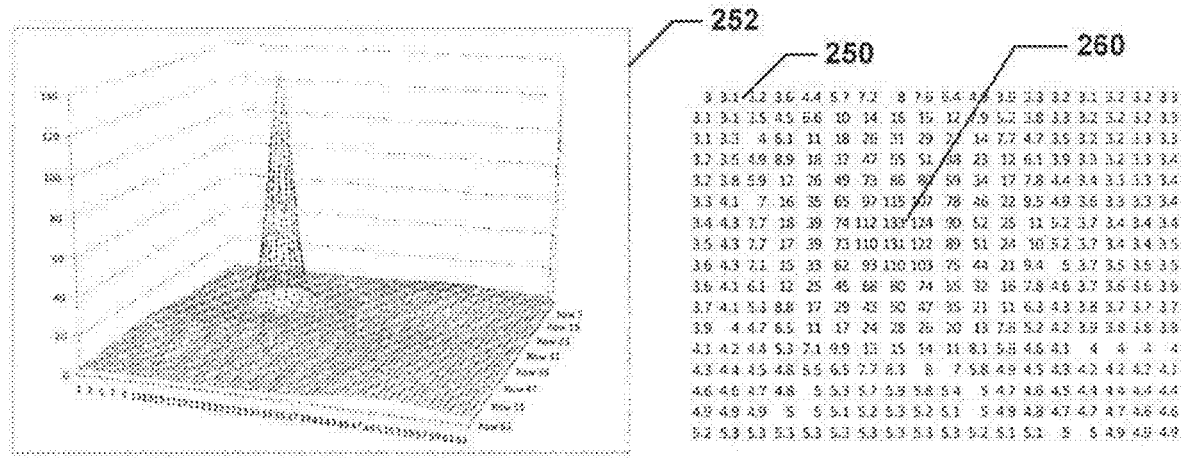
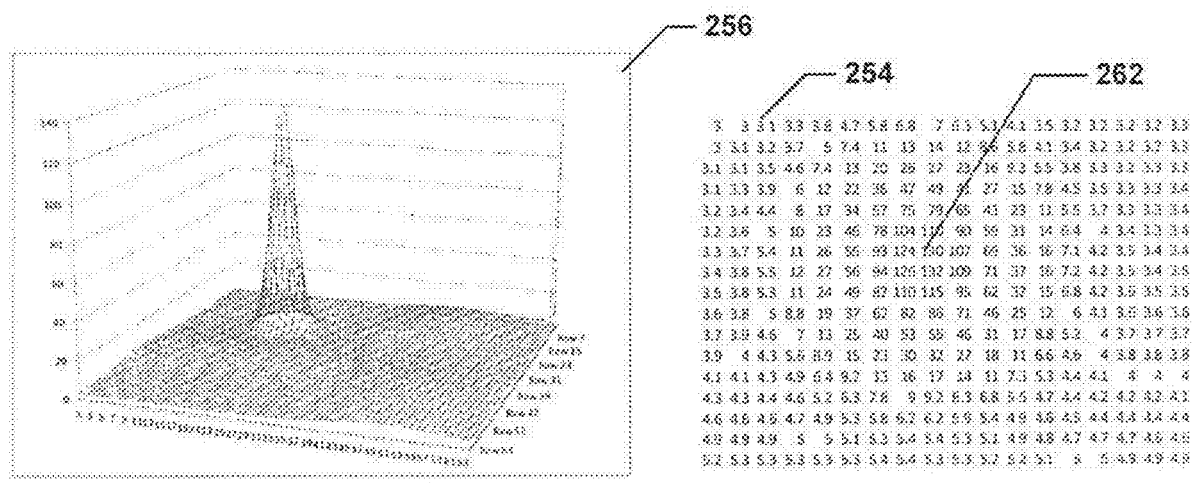

FIG. 26

| feature f | feature type | proj_angle | distance | intensity | slope | time |
|---|---|---|---|---|---|---|
| | <point> | | | | | |

270
268
272

FIG. 29
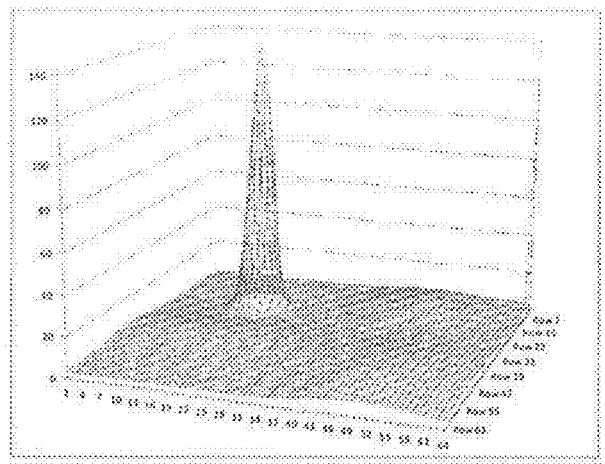
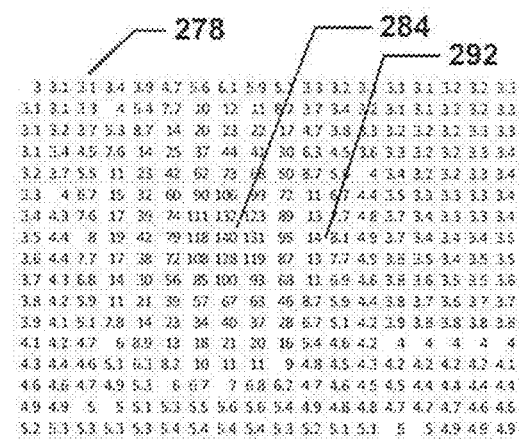
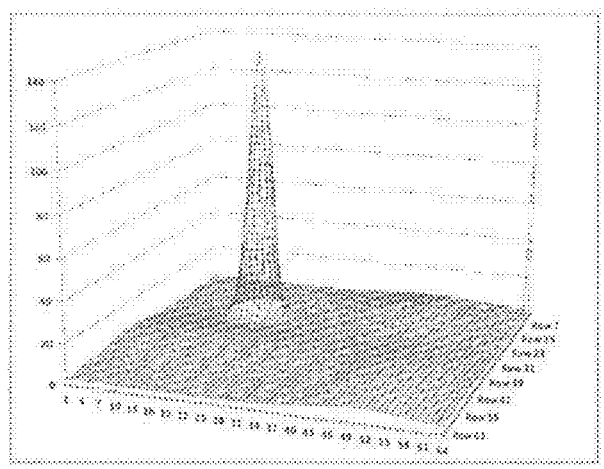
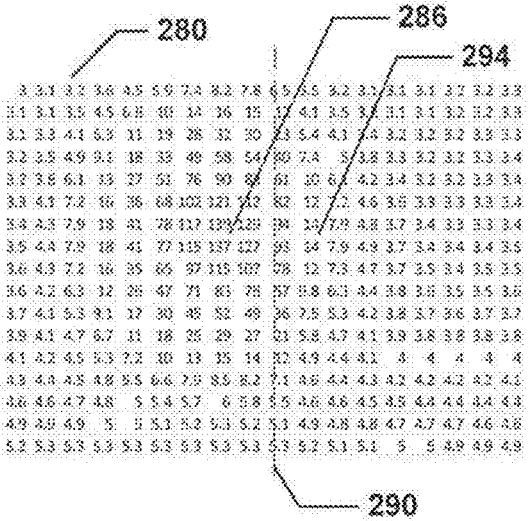
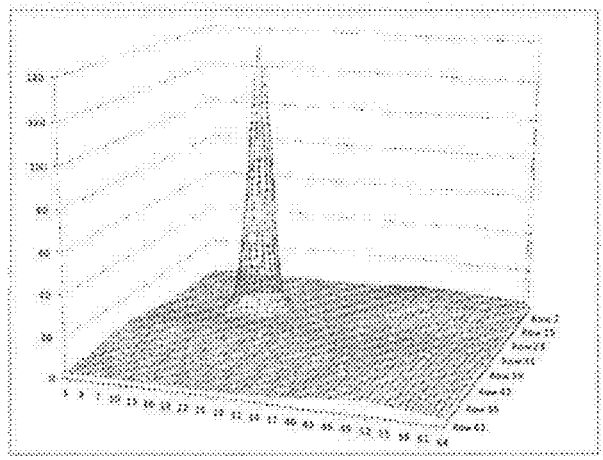
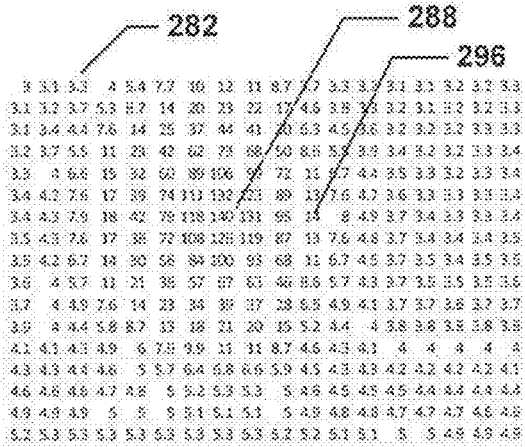

FIG. 31

| | | |
|---|---|---|
| feature f | | |
| | feature type | <point> |
| | proj_angle | |
| | distance | |
| | intensity | |
| | slope | |
| | time | |
| feature f+1 | | |
| | feature type | <point> |
| | proj_angle | |
| | distance | |
| | intensity | |
| | slope | |
| | time | |
| feature f+2 | | |
| | feature type | <edge> |
| | proj_angle | |
| | distance | |
| | time | |
| | edge_angle | |

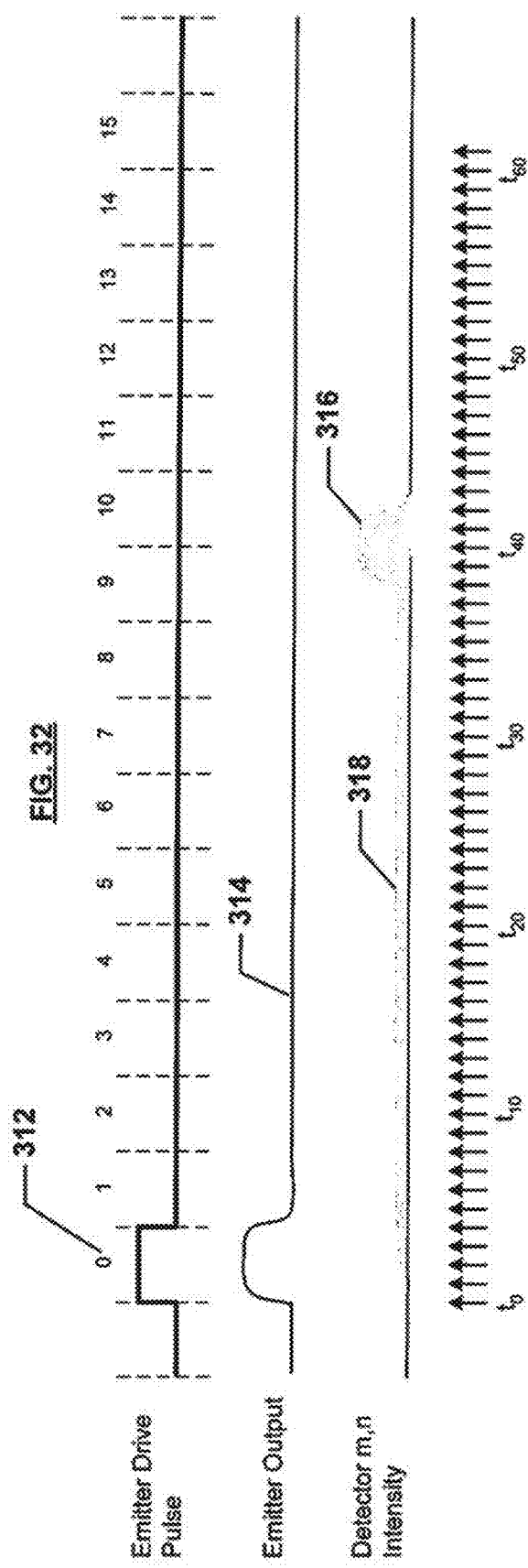

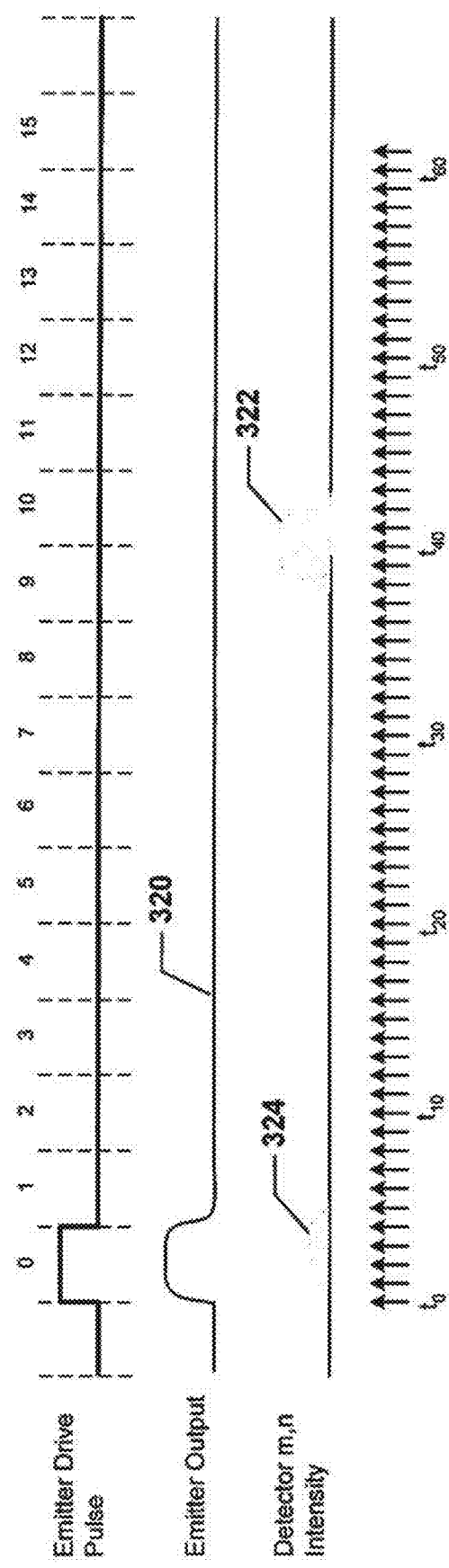

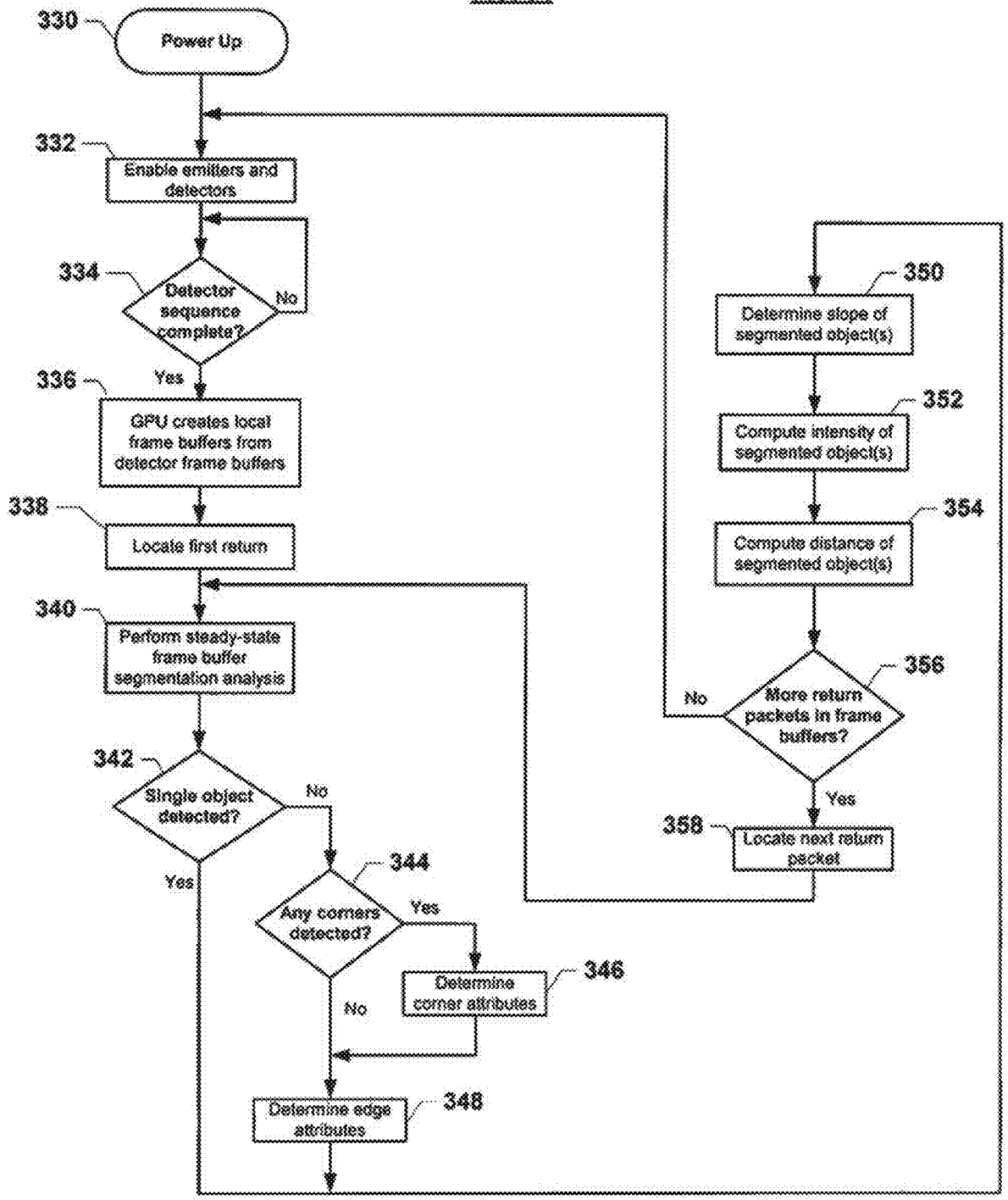

METHODS AND APPARATUS FOR OBJECT DETECTION AND IDENTIFICATION IN A MULTIPLE DETECTOR LIDAR ARRAY

RELATED APPLICATION

This application is a continuation of application Ser. No. 14/251,254 filed Apr. 11, 2014, now U.S. Pat. No. 9,360,554 issued Jun. 7, 2016, which is hereby fully incorporated herein by reference.

FIELD OF THE INVENTION

The invention relates generally to determining presence and position in a surrounding space of objects that interact with propagating electromagnetic waves. More particularly, the present invention relates to LiDAR systems using one or more emitters and a detector array to cover a given field of view wherein the detector array can produce a multitude of features based on volumetric analysis of each emitted light packet.

BACKGROUND OF THE INVENTION

LiDAR (light detection and ranging) uses laser technology to make precise distance measurements over short or long distances. LiDAR units have found widespread application in both industry and the research community.

The predecessor technology to current LiDAR units were object detection systems that could sense the presence or absence of objects within the field of view of one or more light beams based on phase shift analysis of the reflect light beam. Examples of these kinds of object detection systems in the field of vehicle "blind spot" warning systems include U.S. Pat. Nos. 5,122,796, 5,418,359, 5,831,551, 6,150,956, and 6,377,167.

Current LiDAR units are typically scanning-type units that emit beams of light in rapid succession, scanning across the angular range of the unit in a fan-like pattern. Using a time of flight calculation applied to any reflections received, instead of just a phase shift analysis, the LiDAR unit can obtain range measurements and intensity values along the singular angular dimension of the scanned beam. LiDAR units typically create the scanning beam by reflecting a pulsed source of laser light from a rotating mirror. The mirror also reflects any incoming reflections to the receiving optics and detector(s).

Single-axis-scan LiDAR units will typically use a polygonal mirror and a pulsed laser source to emit a sequence of light pulses at varying angles throughout the linear field of view. Return signals are measured by a bandpass photoreceptor that detects the wavelength of light emitted by the laser. The field of view of the photoreceptor covers the entire one-dimensional scan area of the laser. Thus, each subsequent emitted pulse of laser light must occur only after the reflected signal has been received for the previous laser pulse. Dual-axis-scan LiDAR units produce distance-measured points in two dimensions by using, for instance, a pair of polygonal mirrors. The horizontal scan mirror rotates at a faster rate than the vertical scan mirror. An example of a long-range scanning-type LiDAR for satellite and aircraft is U.S. Pat. No. 7,248,342 that describes scanning of both the transmitted and received laser signals along with a linear arrangement of pixel sensors referred to as a "push broom" sensor for detecting the received laser signals as it is scanned back and forth. U.S. Pat. No. 8,599,367 describes an improved push broom approach that uses laser light with different frequency components and then separates the frequency components received as reflected signals to be detected by different linear pixel sensors.

Image-type LiDAR units offer a way to acquire a 3D map of a scene via a solid state or mostly solid state approach in the form of a detector array. These image-type devices are often referred to as flash LiDAR devices because they illuminate an entire 2D field of view with a blanket of light and then simultaneously measure the return value time for each photoreceptor location in the detector array that covers the field of view. Examples of image-type LiDAR units include U.S. Pat. Nos. 7,551,771 and 8,072,581. Unfortunately, these approaches have been relegated to very close proximity applications due to the low incident laser power available for each location in the field of view. For flash LiDAR at longer ranges, the usable field of view is typically too small for applications like autonomous vehicle navigation without the use of high performance cameras operating in the picosecond range for exposure times.

U.S. Pat. No. 7,969,558 describes a LiDAR device that uses multiple lasers and a 360-degree scan to create a 360-degree 3D point cloud for use in vehicle navigation. The disclosed system has three limitations. First, the rotating scan head makes the unit impractical for widespread use on autonomous vehicles and makes it unusable for inclusion in mobile devices like smart phones, wearable devices, smart glasses, etc. Second, multiple units cannot work effectively in the same relative physical space due to the potential of crosstalk. Third, the throughput of the device is limited to measurements along a single angular direction for each emitted light pulse.

US Publ. Appl. No. 2011/0313722 A1 describes a LiDAR technique used for determining the object distance in the presence of an aerosol cloud. The technique relies on analysis of a trailing edge of a given light pulse compared to an established threshold to remove reflected energy from the aerosol cloud, such as fog. U.S. Pat. No. 8,242,428 describes a LiDAR system that utilizes modulated light pulses detected by two detectors at different distances to perform quantum ghost imaging analysis. While these techniques may be useful for the specific issues addressed, such as fog or ghost imaging, these techniques address special case scenarios and are not generally applicable beyond these special cases.

LiDAR units have the potential to be utilized extensively in applications like autonomous vehicle navigation, mobile computing, and wearable devices. However, the high throughput and high resolution necessary for autonomous vehicle navigation cannot be met with present LiDAR approaches. Furthermore, 3D point cloud approaches are inadequate for object identification and high-frequency feature extraction in real-time applications like autonomous vehicle navigation.

SUMMARY OF THE INVENTION

LiDAR (light detection and ranging) systems in accordance with various embodiments of the invention use one or more emitters and a detector array to cover a given field of view where the emitters each emit a single pulse or a multi-pulse packet of light that is sampled by the detector array. On each emitter cycle the detector array will sample the incoming signal intensity at the pre-determined sampling frequency that generates two or more samples per emitted light packet to allow for volumetric analysis of the retroreflected signal portion of each emitted light packet as reflected by one or more objects in the field of view and then received by each detector.

LiDAR systems in accordance with various embodiments of the invention use a detector array and a graphics processing unit (GPU) to interpret the retroreflected signal to produce multiple output points corresponding to a single emitted light packet. In an embodiment the GPU establishes N points in a pre-defined grid of points throughout the field of view of the emitter. In an embodiment the GPU utilizes segmentation to differentiate between multiple objects in a single field of view. In another embodiment the GPU defines an edge feature describing the edge of an object in the field of view. In another embodiment the GPU defines a corner feature describing the corner of an object in the field of view.

LiDAR systems in accordance with various embodiments of the invention utilize a plurality of frame buffers corresponding to the detector array at different portions of the cycle associated with a given emitted light packet. In some embodiments at least three different frame buffers are used for detection and identification of objects in the field of view of the emitter. In some embodiments, a leading-edge frame buffer, a steady-state-frame buffer, and a trailing-edge frame buffer are analyzed by the GPU to compare relative ratios among detectors in the array. In other embodiments, a ramp-up frame buffer, a steady-state frame buffer, and a ramp-down frame buffer are used by the GPU to compare and/or reconstruct relative intensities among detectors in the array.

LiDAR systems in accordance with various embodiments determine other attributes of the objects in the field of view. The slope of the object—where slope is defined as the normal vector of the surface of a detected object whereby the vector is expressed as an angle relative to the measurement device—is determined through analysis of received waveforms. Time domain analysis for leading-edge, steady-state, and trailing-edge portions of light packets as reflected allows the GPU to determine the direction and the rate of the slope of detected objects. In some embodiments, the GPU utilizes analysis of neighboring detectors to facilitate in determination of angles of the retroreflected light energy.

In various embodiments, calibration of a given LiDAR system in accordance with the present invention may be utilized to account for manufacturing, aging and related differences in the emitter and detector array. In situ calibration, for example, may be performed by emitting predetermined calibration patterns and measuring the intensity, location, and angle of the reflected signals. Characterization of the intensity of the emitted beam may be determined throughout the entire cross section of the beam and may be utilized to differentiate light energy patterns and resolve between emitted and reflected light energies. Characterization parameters unique to the given LiDAR system may be saved in a profile for the unit that can account for any modified optical path of the incident and/or reflected light and provide for better determination of the center vector of each emitter and for more accurate volumetric analysis of the light packets.

LiDAR systems in accordance with various embodiments compute object intensity for multiple objects within a field of view. In various embodiments the reported intensity is modified based on environmental factors such as rain, fog, and snow. In various embodiments the reported intensity is modified based on the location and severity of dirt or other foreign substance that has accumulated on a windshield or other protective layer near the device.

In various embodiments, each detector in the array-based LiDAR unit has a unique angle of through which the reflected light energy is received. For purposes of the present invention, the angle is defined as the center of the area of the light beam received by the detector not including any modifications to the light beam due to optic elements internal to the LiDAR unit. In some embodiments, the light energy or light packet is emitted and received as near-collimated or coherent electromagnetic energy, such as common laser wavelengths of 650 nm, 905 nm or 1550 nm. In some embodiments, the light energy can be in the wavelength ranges of ultraviolet (UV)—100-400 nm, visible—400-700 nm, near infrared (NIR)—700-1400 nm, infrared (IR)—1400-8000 nm, long-wavelength IR (LWIR)—8 um-15 um, far IR (FIR)—15 um-1000 um, or terahertz—0.1 mm-1 mm. The various embodiments of the present invention can provide increased device throughput, an increased number of computed points per emitted light packet, and additional point and linear feature elements at these various wavelengths.

BRIEF DESCRIPTION OF THE DRAWINGS

FIG. 8 illustrates an output file format for LiDAR points according to the prior art.

FIG. 9 illustrates a block diagram of a flash LiDAR system according to the prior art.

FIG. 15 illustrates sampled signals for a single-object return.

FIG. 17 illustrates sampled signals for a multiple-object return.

FIG. 19 illustrates an output file format for a regular grid of LiDAR points for a multiple-object return.

FIG. 21 illustrates an output file format for object locations of LiDAR features for a multiple-object return.

FIG. 24 illustrates sampled signals for a single, non-normal object.

FIG. 26 illustrates an output file format for a regular grid of LiDAR points for a single, non-normal object return.

FIG. 29 illustrates sampled signals for a multiple, non-normal objects.

FIG. 31 illustrates an output file format for object locations of LiDAR features for multiple, non-normal object returns.

FIG. 32 illustrates electrical and optical signal timing for an object partially obscured by fog.

FIG. 33 illustrates electrical and optical signal timing for an object partially obscured by foreign matter at or near the protective layer of the device.

FIG. 34 illustrates a flow chart for LiDAR frame buffer processing for object identification.

DETAILED DESCRIPTION OF THE DRAWINGS

Figure 1:
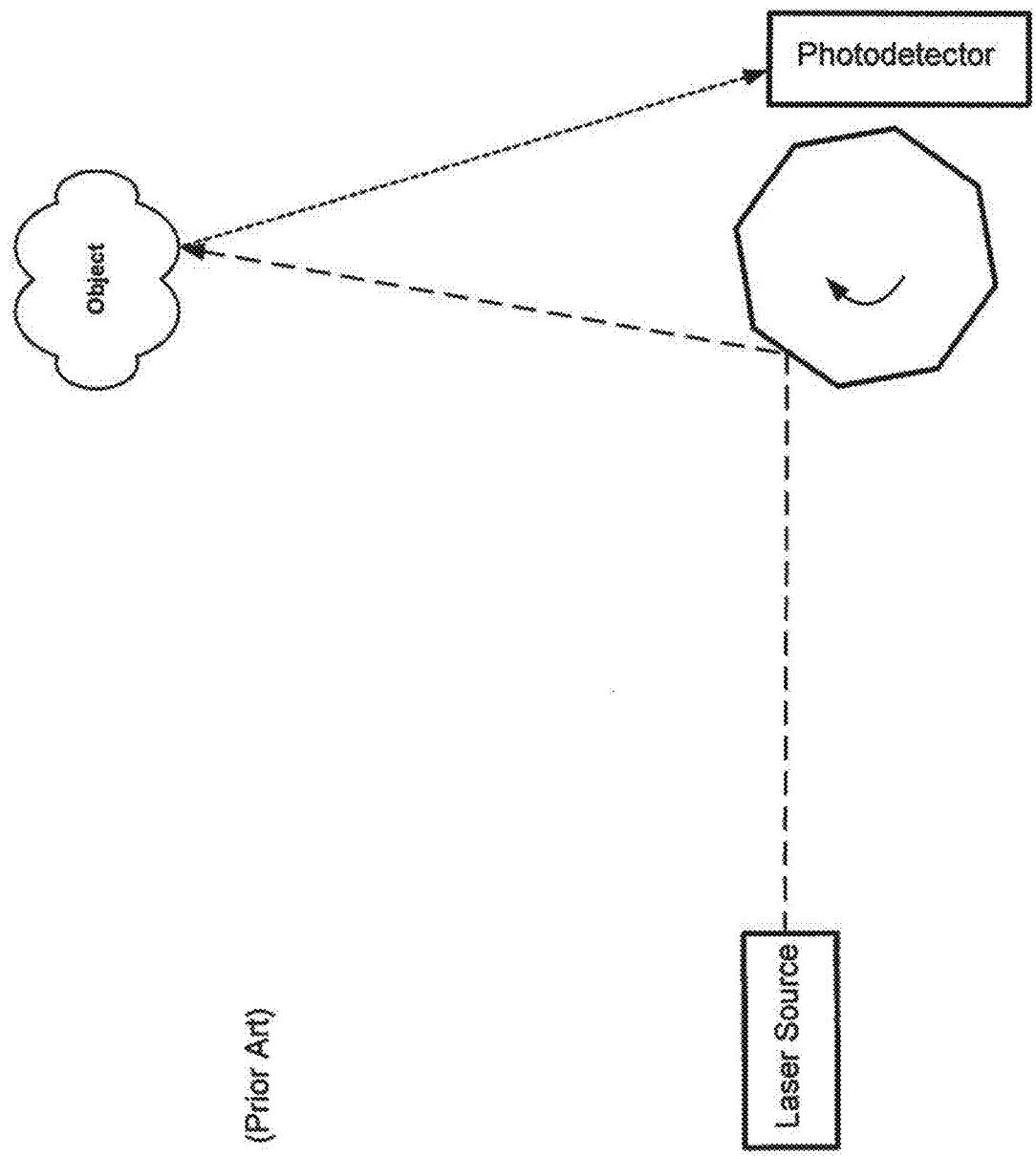
FIG. 1 illustrates a single-axis-scan device according to the prior art.

Single-axis-scan LiDAR (light detection and ranging) units will typically use a polygonal mirror and a pulsed laser source to emit a sequence of light pulses at varying angles throughout the linear field of view. Return signals are measured by a bandpass photoreceptor that detects the wavelength of light emitted by the laser. The field of view of the photoreceptor covers the entire scan area of the laser. Thus, each subsequent emitted pulse of laser light must occur only after the reflected signal has been received for the previous laser pulse. FIG. 1 shows some essential elements of a typical single-axis-scan LiDAR unit. The laser source is pulsed multiple times as each face of the polygonal mirror rotates past the laser axis. Each rotation of a mirror face corresponds to a single linear scan of locations. For each point of a scan, the distance and angle are recorded. Many LiDAR applications also include return signal intensity, thus encoding more information about the object that produced the reflected the return signal. Two dimensional scans of objects and/or scenes are created by affixing a single-axis-scan LiDAR to an object in motion, with the scan axis of the LiDAR roughly perpendicular to the travel direction of the vehicle.

Figure 2:
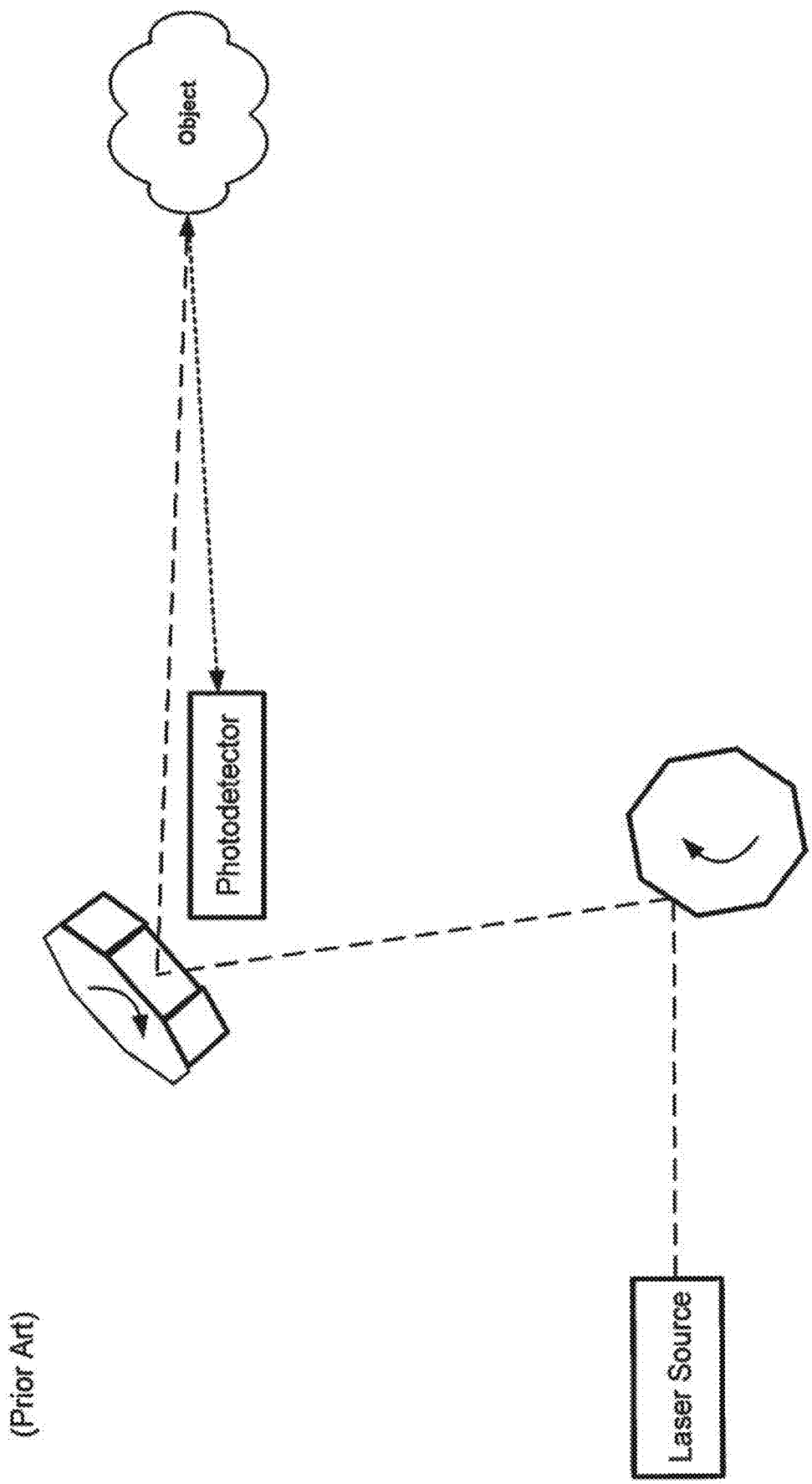
FIG. 2 illustrates a dual-axis-scan device according to the prior art.

Dual-axis-scan LiDAR units produce distance-measured points in two dimensions by using, for instance, a pair of polygonal mirrors. The horizontal scan mirror rotates at a faster rate than the vertical scan mirror. FIG. 2 shows some of the essential elements of a typical dual-axis scan LiDAR unit. Other methods can be used to achieve laser scans in two dimensions. These methods, for the most part, rely on mechanical or electromagnetic movement of one or more objects to achieve the laser scan in two dimensions.

Figure 3:
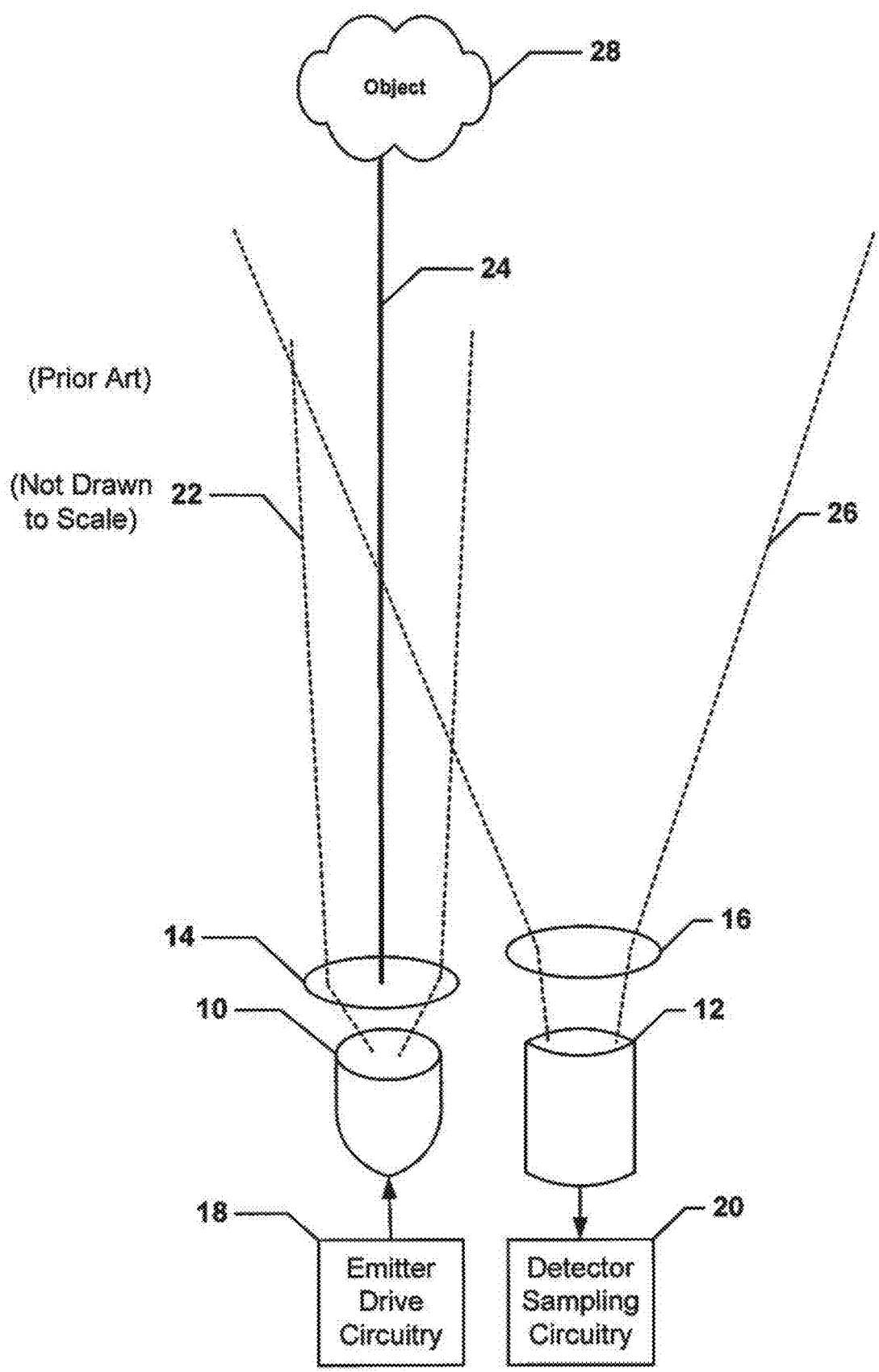
FIG. 3 illustrates the geometry of a single emitter and detector according to the prior art.

FIG. 3 shows the configuration of the optical elements in a typical LiDAR system. The emitter 10 is a light source that is controlled by the emitter drive circuitry 18. The beam of emitted light will typically be near collimated or slightly diverging in multi-point measurement systems and will be widely diverging in flash LiDAR systems. The profile of the emitted beam is typically controlled by a focusing lens 14. FIG. 3 shows the extents 22 of a slightly diverging beam. Incident light from the detector will reach the object 28, with a portion of the light being absorbed by the object, another portion reflected at various angles, and still another portion of the light reflected off the object back toward the light source 10. The detector 12 is typically a photodetector that includes a wavelength filter that allows only photons at or near the wavelength of the emitter 10. A lens 16 is typically used to establish the field of view 26 of the detected photons. The detector sampling circuitry 20 will sample the detected signal as various intervals throughout the device's capture cycle. The mid-point of the emitted beam 24 determines the angle of the detected object 28 relative to the device.

Figure 4:
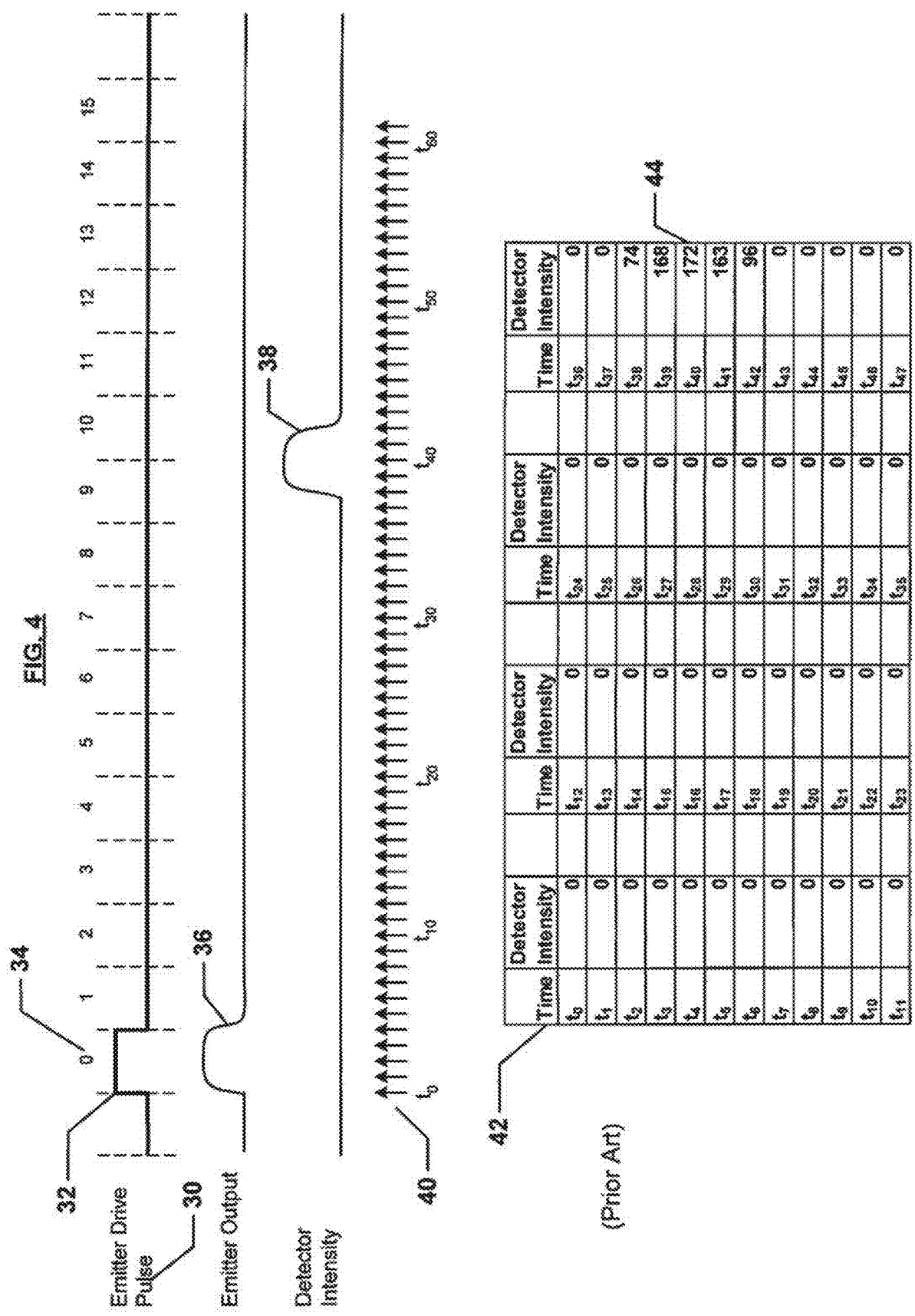
FIG. 4 illustrates the electrical and optical signal timing of a single emitter and detector with a single return according to the prior art.

The timing diagram in FIG. 4 shows some of the essential electrical and optical elements of a typical emitter/detector cycle. A high level 32 on the emitter drive pulse 30 controls the enabling of the emitter output 36. In FIG. 4 the emitter drive pulse 30 is activated during emitter cycle number 0 34. The detector samples 40 are taken at periodic intervals throughout an emitter cycle. These samples are typically digital representations of the A/D converted signal from the detector. The detector intensity 38 increases at some point in time after the start of the emitter cycle. Starting at $t_0$, the detector level is sampled at each detector interval and the sampled value is stored in a detector frame buffer 42.

Upon completion of the emitter/detector cycle the frame buffer 42 is post-processed to determine the time of flight for the light. The typical equation for time of flight (tof) is:

$$\text{tof} = \lambda_{detector} * k \qquad \text{(Eq. 1)}$$

where $\lambda_{detector}$ is the period of the detector clock
k is the detector counter value that signifies when the reflected signal is sensed by the detector For the emitter/detector cycle shown in FIG. 4 the value of k for Eq. 1 would be 38 (the leading edge of the sampled signal), 39 (the sample at which full intensity is detected), 38.5 (the mid-point of the leading edge sample and the full intensity sample), or some other interpolation technique used for sub-sample determination. The intensity of the sampled waveform will typically be the maximum intensity value 44 in the frame buffer 42.

Figure 5:
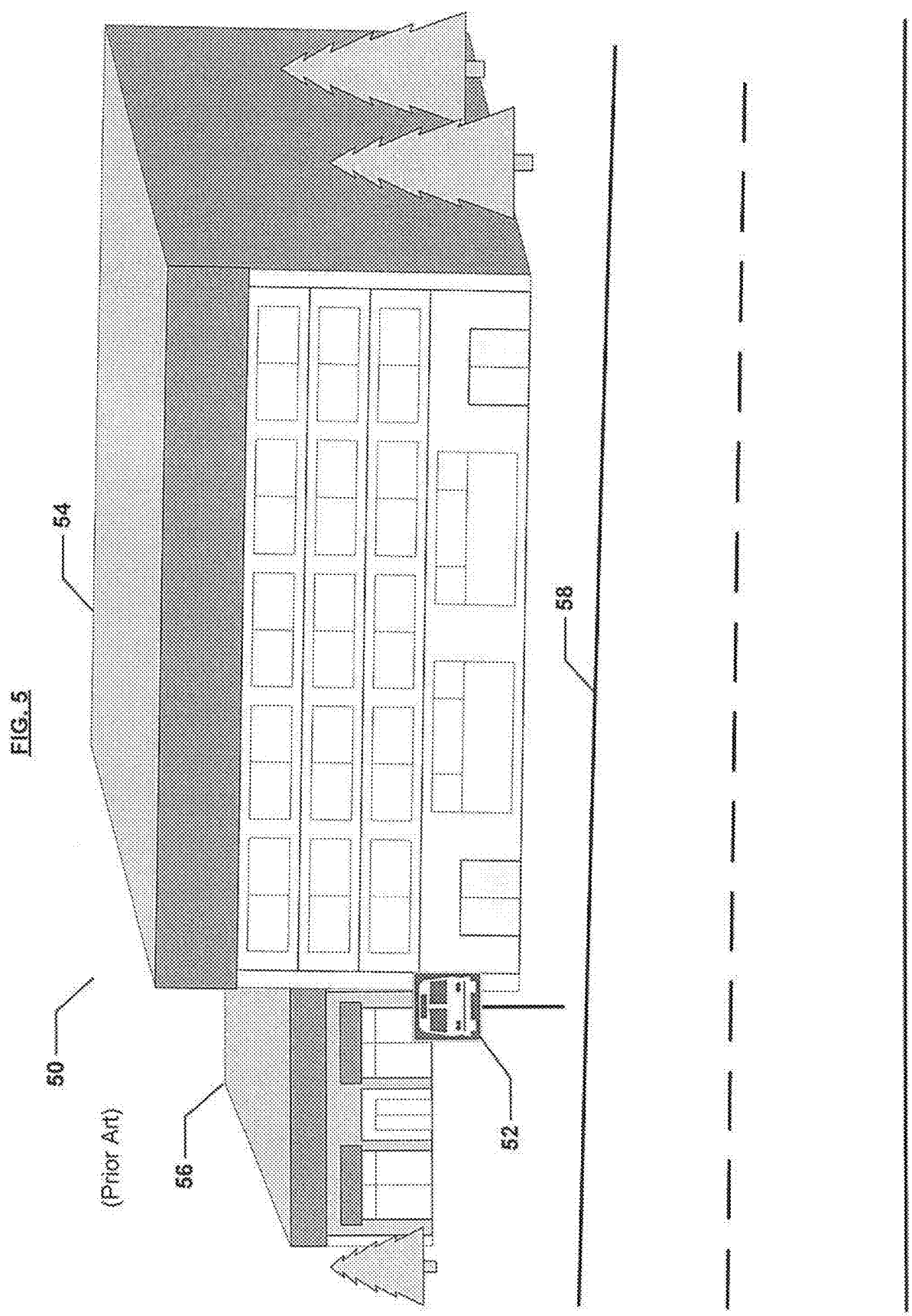
FIG. 5 illustrates a roadside scene utilized for the description of the invention.

While the previous example determined the distance and angle for a single object that was illuminated by the emitter light, in practice the incident beam of a LiDAR device will rarely reflect off a single, uniform object. FIG. 5 shows a roadside scene 50 that can be measured with a LiDAR device. Some important features in this scene are a reflective road sign 52, a large foreground building with windows 54 near the roadway 58, and a background building 56 set back from the roadway 58.

Figure 6:
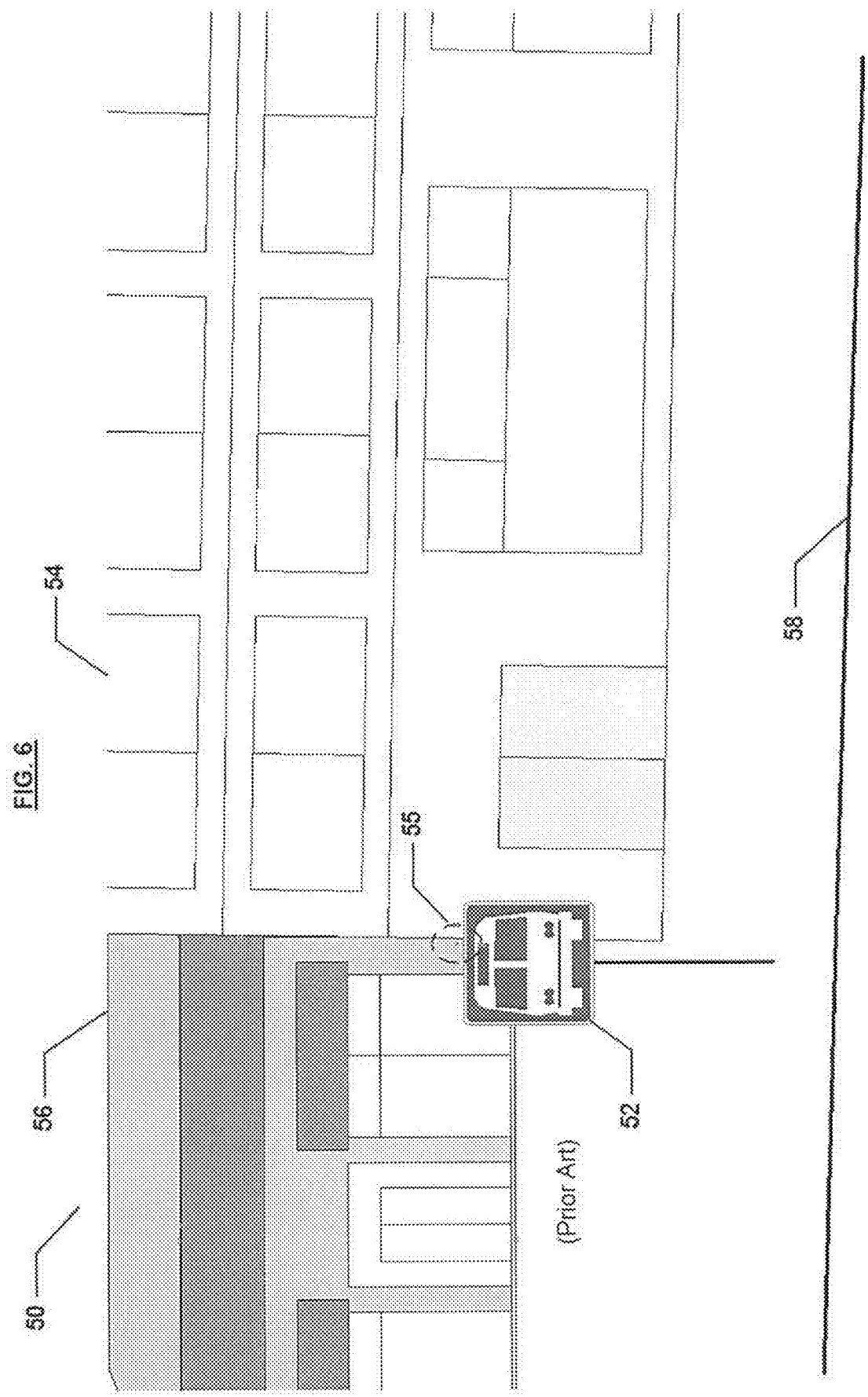
FIG. 6 illustrates an area of interest for describing LiDAR processing according to the prior art.

FIG. 6 shows a zoomed-in view of the roadside scene 50 with an outline 55 showing the location of a light beam as it intersects multiple surfaces. The distances of the three objects 52, 54, 56 from the LiDAR device differ from one another, their reflective characteristics are probably different, and their locations are somewhat different relative to the LiDAR device.

Figure 7:
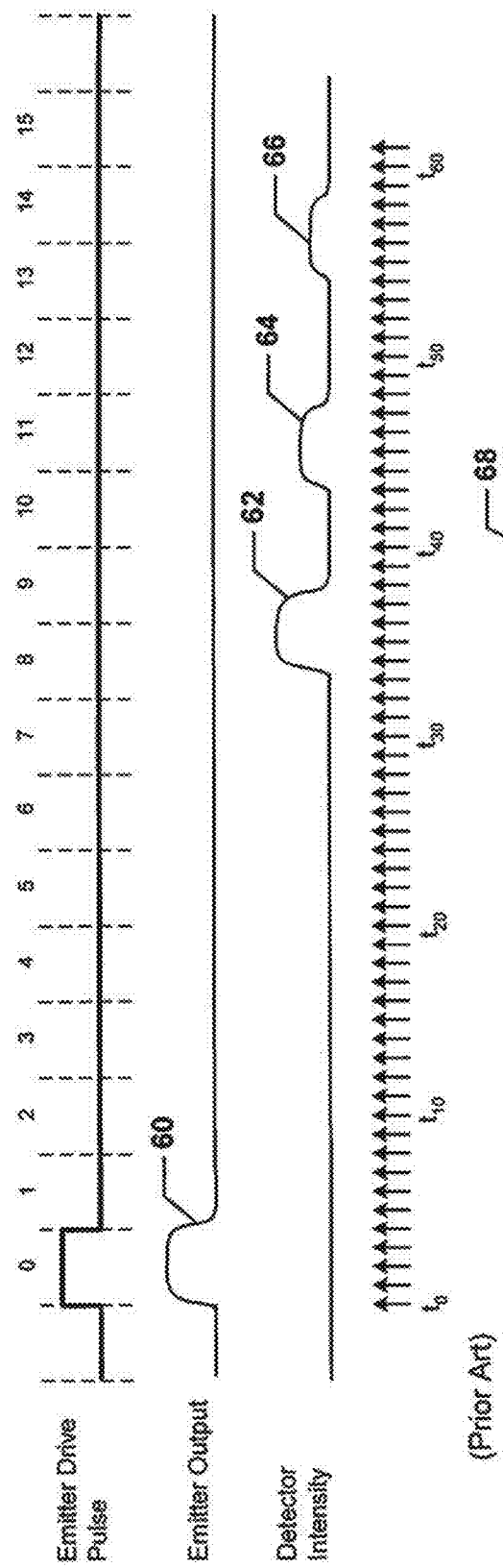
FIG. 7 illustrates the electrical and optical signal timing of a single emitter and detector with multiple returns according to the prior art.

FIG. 7 shows the emitter/detector cycle for the location determination for the roadside scene. The emitter output 60 is energized at $t_0$ and the detector intensity exhibits three distinct waveforms—the first waveform 62 at $t_{34}$, the second waveform 64 at $t_{44}$, and the third waveform 66 at $t_{55}$. The sampled detector results are shown in the detector frame buffer 68. Some prior art LiDAR devices will only report single distance measurements. For devices in this category, the reported distance for this emitter/detector cycle would be the distance computed from the first waveform 62 using Eq. 1. The angle of the point would be reported at the center angle of the emitter beam. More advanced prior art LiDAR devices will report multiple returns, and will also report the intensity of each return. For these multi-return intensity devices, the output information reported to the application would likely be as shown in FIG. 8.

Upon completion of an emitter/detector cycle, the prior art device must report the results to the requestor of information. The data structure 70 shown in FIG. 8 represents the points 72 detected by three consecutive incident beams from the emitter. These points 72 can be from the same emitter in a mechanically scanning device or can be from different emitters within the same device. In a multi-return device, the angle 74 for the return values will be the same for each return. The angle 74 is defined as the incident angle of the emitter when the light pulse was emitted. The angle 74 typically specified in degrees, radians, or vector notation and is relative to a defined vector on the device. The reported angle 74 for each point will be relative to the same defined vector.

The time 76 element reports the point in time at which the incident beam was emitted or when the beam was detected. Multi-return prior art systems will typically report the same time 76 for every return. Since the number of returns is variable, the number of returns element 78 will report the number of detected returns for this point 72. The intensity for return0 80 and the distance for return0 82 are reported as the first elements in the returns part of the data structure for point p 72. Since each return will have a different intensity value and a different distance, these values are reported separately for each return for a point p 72.

Flash LiDAR systems typically utilize a single emitter to cover a scene with laser light and utilize a detector array to establish 3D point locations relative to the device. Each detector in the detector array will measure the time of flight for the first return signal, or via periodic sampling will determine the time of flight of the emitted and detected photons.

FIG. 9 shows a flash LiDAR emitter 400 directed toward a planar surface 404 that is positioned at an oblique angle to the emitter 400. The emitter 400 emits light for a defined period of time, e.g. 10 nanoseconds, and the incident light packet 402 is shown as a collection of photons traveling through space at a time after the emitter 400 emits the light pulse. The incident light packet 402 is collimated and is reflected off the surface 404 back toward the light source 400. The reflected light packet 406 will often have a different shape and different energy distribution throughout the packet depending on characteristics of the surface 404. The reflected light packet 406 is focused onto a detector array 410 with a lens 408.

Flash LiDAR systems that accurately measure time of flight for first-return photons can interpret some amount of surface 404 angularity if the time-of-flight circuitry is sufficiently fast to differentiate between photons that arrive at different first-return times. In sampling flash LiDAR systems, once again the sampling rate must be sufficiently fast in order to detect small differences in the times of flight of reflected photons. Typical response times for the sampling rate and/or processing by the time-of-flight circuitry may range from 10 picoseconds to 10 nanoseconds and may depend up the nature/frequency of the light energy that is emitted.

It would be an advantage for a multi-return system to report a different angle for each return. The use of a single detector with a wide field of view like that shown in FIG. 3 makes it impossible to differentiate reflected light angles in multi-return situations. In order to increase the accuracy and resolution for each emitted packet of light energy a new approach is desirable. Various embodiments of the present invention disclosed herein utilize a multi-detector sensing mechanism and image analysis techniques to increase the spatial accuracy (the detected angle) of detected objects. Some of the embodiments of the present invention also disclose techniques to increase the resolution (the number of object points per incident light packet) of the detected objects. Further embodiments of the present invention disclose techniques to enhance the reported data about detected objects to include information like object edges, corners and normal angles of surfaces of objects.

Figure 10:
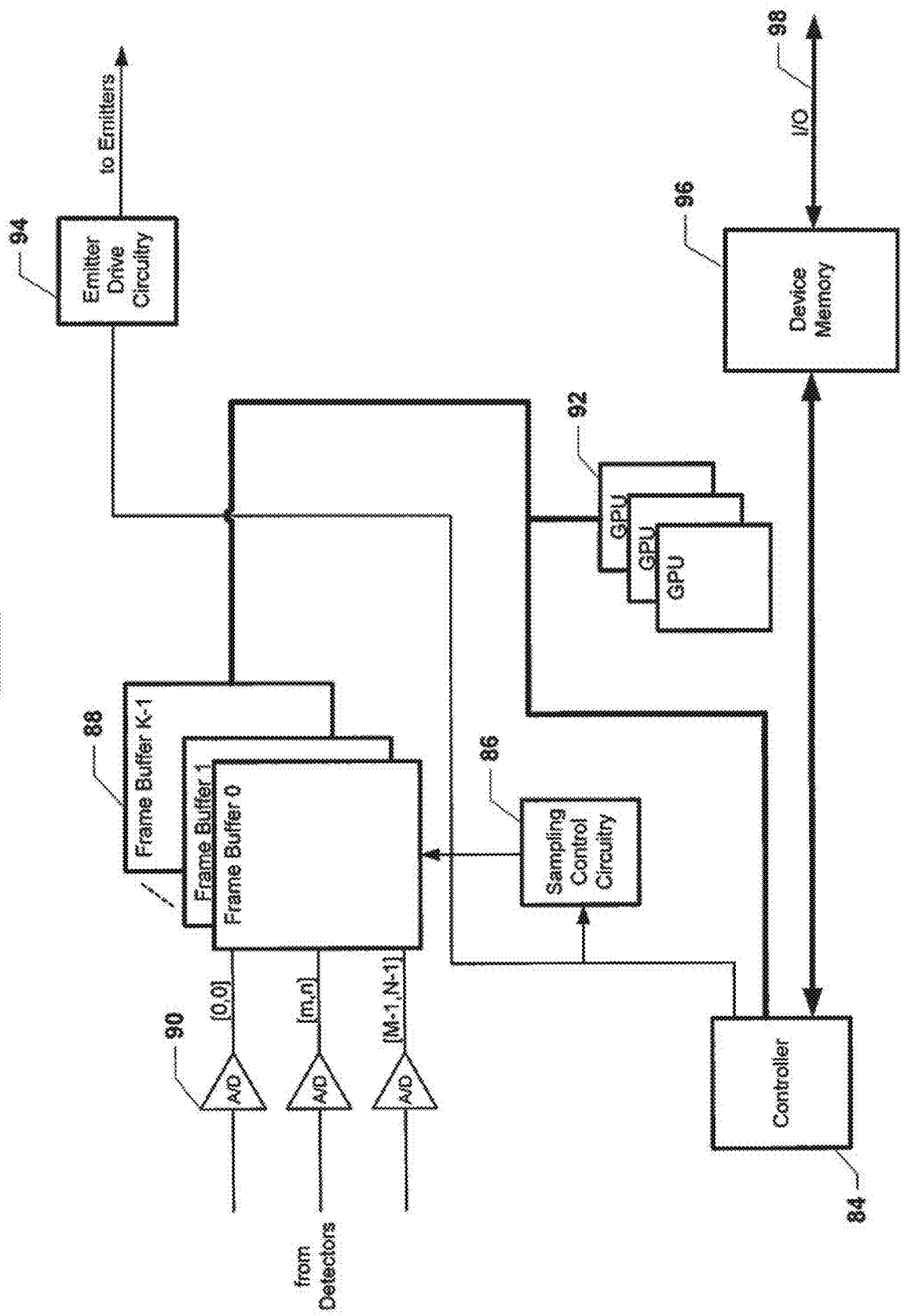
FIG. 10 illustrates a block diagram of the electrical and optical elements of an embodiment of the invention.

FIG. 10 shows some of the elements of a device in accordance with various embodiments of the present invention that can be used to improve the resolution, spatial accuracy and information types for detected objects. Emitter drive circuitry 94 is used to control the incident light from the plurality of emitters. The techniques herein can be implemented to enhance a single emitter device as well as a multi-emitter device. The emitters can be part of this device or can be part of a disparate device. One differentiating aspect of the embodiments of the FIG. 10 system is the detector circuitry has precise knowledge of when the emitters are energized. The device contains a multi-detector configuration consisting of M rows and N columns. Each detector shall have a dedicated A/D converter 90, and there are M×N A/D converters per device.

The frame buffer block contains K frame buffers, where K represents the number of samples acquired for each detector during a single detector/emitter cycle. Frame Buffer 0 88 represents the sampled detector values at time $t_0$ for all M×N detector elements. The number of bits per detector sample will be equivalent to the number of bits produced by each A/D converter 32. As an example, a device that has a detector array of 256 rows and 256 columns will have 65,536 detectors. If each A/D converter 90 in this device has 16 bits, each frame buffer 88 will contain 1,048,576 bits, or 131,072 8-bit bytes. If the number of samples per detector/emitter cycle is 128, there will be 16,777,216 bytes in all of the frame buffers 88.

The sampling control circuitry 86 controls the sampling of the A/D converters 90 for each of the M×N detectors at each of the K frame buffers. Upon completion of the detector/emitter cycle the Graphics Processing Units (GPUs) 92 analyze the frame buffer 88 contents to determine the information for each detected signal. The number of GPUs 92 per device can vary from 1 to M×N. More GPUs 92 will yield greater throughput for the device. In a preferred embodiment the number of GPUs 92 will be equal to the number of emitters utilized for each emitter/detector cycle. Each GPU 92 consists of a processing unit, instruction memory, working memory, result memory and configuration circuitry. The results of the GPU 92 analyses are stored within each GPU 92 and moved to the device memory 96 by the controller 84. Upon completion of the data packet creation in device memory 96, the controller initiates the transmission of the data packets to the requestor via the I/O interface 98. An example of a commercially available multi-GPU device is the nVidea GEFORCE® Titan product that contains 2688 CUDA cores, wherein a CUDA core is described as a parallel computing platform and programming model invented by NVIDIA. It enables dramatic increases in computing performance by harnessing the power of the graphics processing unit (GPU). For a more detailed description of this embodiment of GPU 92, reference is made to the disclosure at http://www.geforce.com/hardware/desktop-gpus/geforce-gtx-titan/specifications, which is hereby incorporated by reference.

Figure 11:
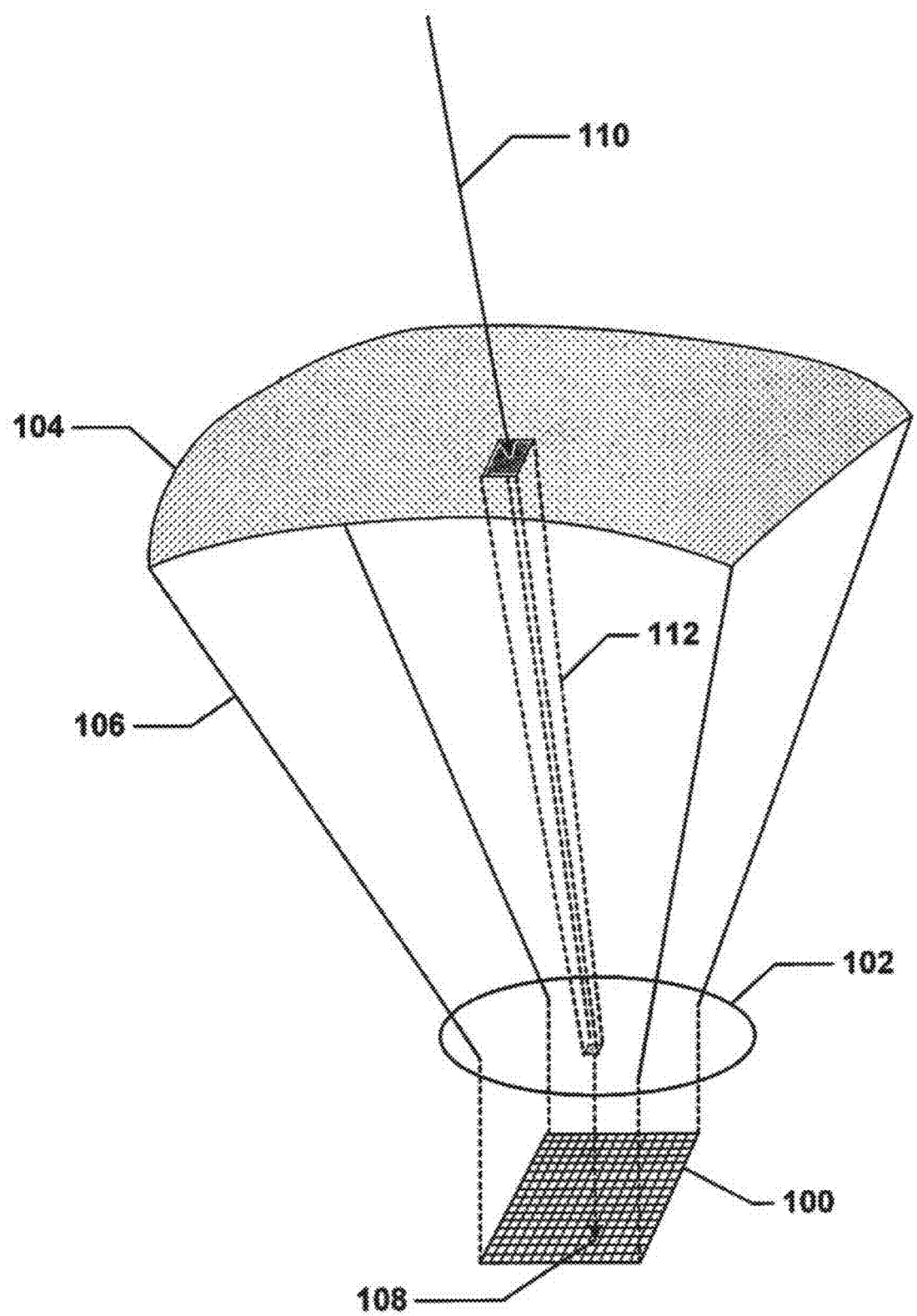
FIG. 11 illustrates the field of view of a lensed detector array.

FIG. 11 shows the optical configuration of one embodiment for a detector array 100. A lens 102 determines the field of view 106 of the detector array 100. The edges of the detector array 100 field of view 106 are defined by angular extents from the normal vector of the device. This same normal vector will serve as the reference vector for subsequent angular measurements for detected objects. The surface 104 shown is a portrayal of the detector array 100 field of view at a constant distance from the array 100. Each detector element 108 in the array 100 will be associated with a different angle 110 within the field of view 106. The field of view 112 of an individual detector 108 will be a subset of the detector array's 100 field of view. Said another way, the detector array 100 field of view 106 is the summation of all of the individual fields of view 112.

An element of various embodiments of the present invention is the determination of an angle 110 for each detector 108. FIG. 11 shows a detector array 100 with a single lens 102. Another embodiment utilizes micro lenses at each detector element 108 wherein the individual micro lenses are configured to transmit reflected light at various angles throughout the field of view 106. Another embodiment utilizes detector elements 108 with waveguides at various angles throughout the field of view 112. For a single-lens 102 system like that of FIG. 11 with a lens 102 configured to transmit in-focus light to the array 100, the individual fields of view 112 are essentially adjacent to the fields of view of the neighboring detectors 108 in the array 100. Out-of-focus lenses 102 will produce overlapping fields of view 112 for individual detectors 108. Waveguide detectors will likely produce overlapping fields of view 112 for individual detectors 108. Micro lenses will also likely produce overlapping fields of view 112 for the individual detectors 108. All of these overlapping field-of-view embodiments produce reliable results according to the specifications herein. The features of the optical detection system of these embodiments are that multiple detector elements comprise a device's field of view 106, and every element in the detector array is defined by the angle 110 that determines the detector 108 field of view 112.

Variations will occur in the fabrication of LiDAR devices. In single-lens 102 detector array devices like that shown in FIG. 11, miniscule differences in the alignment of the array 100 and the lens 102 can cause differences in the detector angles between separate devices. Because of the minor fabrication and assembly differences between devices, each device will undergo a characterization process after production. The characterization process will define the central angle 110 for each as-constructed detector 108. In various embodiments, characterization data from this process is stored in non-volatile memory or in a configuration file for every device. Waveguide and micro lens devices will require similar characterization to establish angles 110 for each detector element 108.

Due to the importance of the optical path in the embodiments, in situ calibration may be desirable for devices according to various embodiments of the present invention. As an example, a LiDAR device according to one embodiment of the present invention may be used as a sensor in an autonomous vehicle. In order to protect the device it may be mounted inside a passenger vehicle affixed to the windshield behind the rear-view mirror. Since the device is facing in front of the vehicle, emitted light and reflected light will pass through the windshield on its way to and from external objects. Both components of light will undergo distortion when passing through the windshield due to reflection, refraction, and attenuation. In situ calibration for said vehicle device would consist of the device emitting predetermined calibration patterns and measuring the intensity, location, and angle of the reflected signals. The device characterization parameters would be updated to account for the modified optical path of the incident and/or reflected light.

Figure 12:
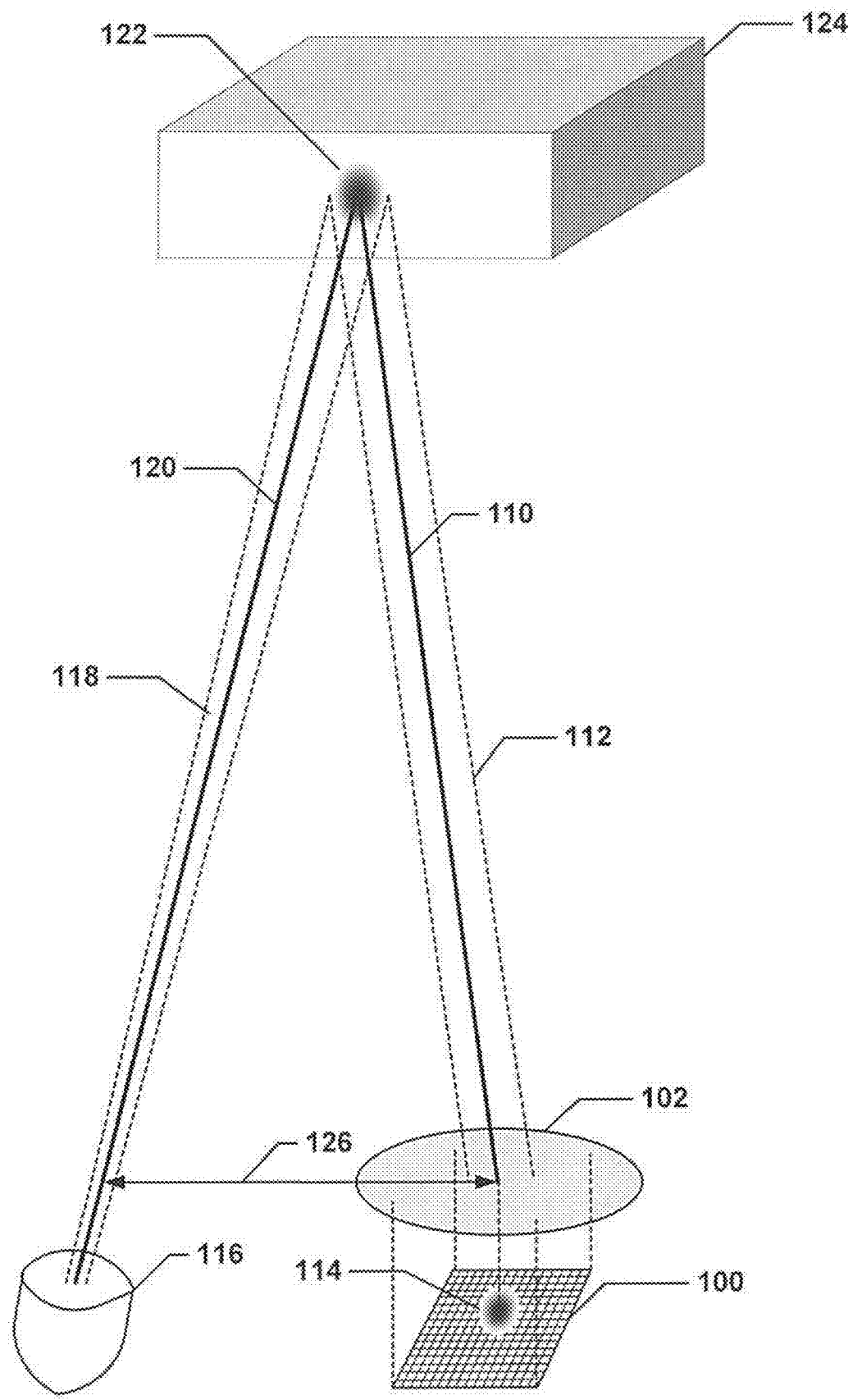
FIG. 12 illustrates geometric elements of an optical configuration.

FIG. 12 shows a device configuration with a lensed detector array 100, a single emitter 116, and an object 124 with a flat side with a normal vector that is roughly aligned with the normal vector of the device. The light beam from the emitter 116 has a center vector 120 and a field of view 118. Incident photons that contact the surface of an object 124 will undergo one of four main effects. First, some photons will be absorbed by the object 124 and will not be reflected from the object's surface. Second, some photons will exhibit specular (mirror-like) reflection where the angle of incidence on the surface equals the angle at which it is reflected. Third, some photons will exhibit diffuse reflection where the reflected photons project at various angles relative to the surface of the object 124 and relative to the incident angle. Fourth, other photons will exhibit retroreflection where the reflected energy is directed back toward the source of the incident energy, e.g. emitter 116.

Most LiDAR systems utilize detectors that lie along or essentially along the incident axis of the emitter 116. As such, most LiDAR systems measure the retroreflective properties of objects. Some LiDAR systems attempt to include some of the properties of diffuse reflection into the analysis of return signals, but the intensity of the returned diffuse signal is typically very low relative to the retroreflected signal. The reflected light has a centerline 110 and a field of view 112 that intersects the lens 102 surface and is directed toward the detector array 100. The offset 126 between the emitter 116 and detector is relatively small compared to the object 124 distance. However, knowing the offset 126 between each detector element and the emitter 116 that produced the beam is an important parameter in determining the precise distance to the object 124.

The emitter beam is described in various embodiments as non-uniform. In practice the cross-sectional profile of this beam will probably have a two-dimensional Gaussian distribution that has an ovoid shape. The emitted beam will likely have different divergence angles for the horizontal and vertical axis. Each emitter beam will undergo a characterization process whereby the emitted beam's intensity is determined throughout the entire cross section. The beam intensity profile can be described mathematically or numerically. Mathematical representations require less storage on the device, but they may introduce more error than numerical approaches. One skilled in the art can utilize other methods for determining, storing, and manipulating beam profiles. It is the purpose of this invention to utilize any characterized beam profile in the processing of reflected signals to enhance the information produced.

A typical beam profile for a two-dimensional Gaussian beam will consist of a center vector and a 2D array of values with each set of values comprising a signal intensity and an angle. The angle of each sub-beam within the array can be expressed as relative to the center vector or relative to the device normal vector. An important feature of the beam profile is that the light intensity is expressed along a defined angle. FIG. 12 shows the reflected beam 114 that has been transmitted by the lens 102 onto the detector array 100. Every element on the array 100 is connected to an A/D converter and sampling circuitry to capture intensity values throughout the device field of view for each sampling event.

The round trip distance from the emitter to the target and back to detector m,n is designated as the sample distance and is expressed as:

$$D_{(sample)[m,n]} = v_{light} * tof_{m,n} \quad (Eq. 2)$$

where $v_{light}$ is the velocity of light in the medium (atmosphere, water, oceans, space, etc.)
where the device is used
$tof_{m,n}$ is the round trip time of flight for the emitted and detected signal From FIG. 12 the sample distance is the sum of the incident and reflected distances and is expressed as:

$$D_{(sample)[m,n]} = D_{incident} + D_{(reflected)[m,n]} \quad (Eq. 3)$$

where $D_{incident}$ is the distance from the emitter to the target
$D_{(reflected)[m,n]}$ is the distance from the target to detector m,n Using the law of cosines, the distances from FIG. 12 can be expressed as:

$$D_{incident}^2 = D_{(reflected)[m,n]}^2 + offset_{m,n}^2 - 2*D_{(reflected)[m,n]}*offset_{m,n}*\cos(90-\alpha) \quad (Eq. 4)$$

where $D_{incident}$ is the distance from the emitter to the target
$D_{(reflected)[m,n]}$ is the distance from the target to detector m,n
$offset_{m,n}$ is the offset distance from the emitter to detector m,n
α is the angle of the center point of the detected signal, expressed in degrees Solving Eq. 3 and Eq. 4 for the distance from the target to each detector:

$$D_{(reflected)[m,n]} = \frac{D_{(sample)[m,n]}^2 - offset_{m,n}^2}{2*D_{(sample)[m,n]} - 2*offset_{m,n}*\cos(90-\alpha)} \quad (Eq. 5)$$

For values of α close to 90 degrees and offset values that are small relative to the reflected distance, the offset terms in Eq. 5 can be ignored and the reflected distance can be expressed as:

$$D_{(reflected)[m,n]} = D_{(sample)[m,n]}/2 \quad (Eq. 6)$$

In an application, for example, where a is 80 degrees, the offset is 30 mm and the sample distance is 20 meters, Eq. 6 will yield a reflected distance of 10 meters while Eq. 5 will yield a reflected distance of 10.00258 meters, or roughly 2.58 mm more than the result of Eq. 6. For high precision measurements Eq. 5 should be used to compute the distances to objects.

Figure 13:
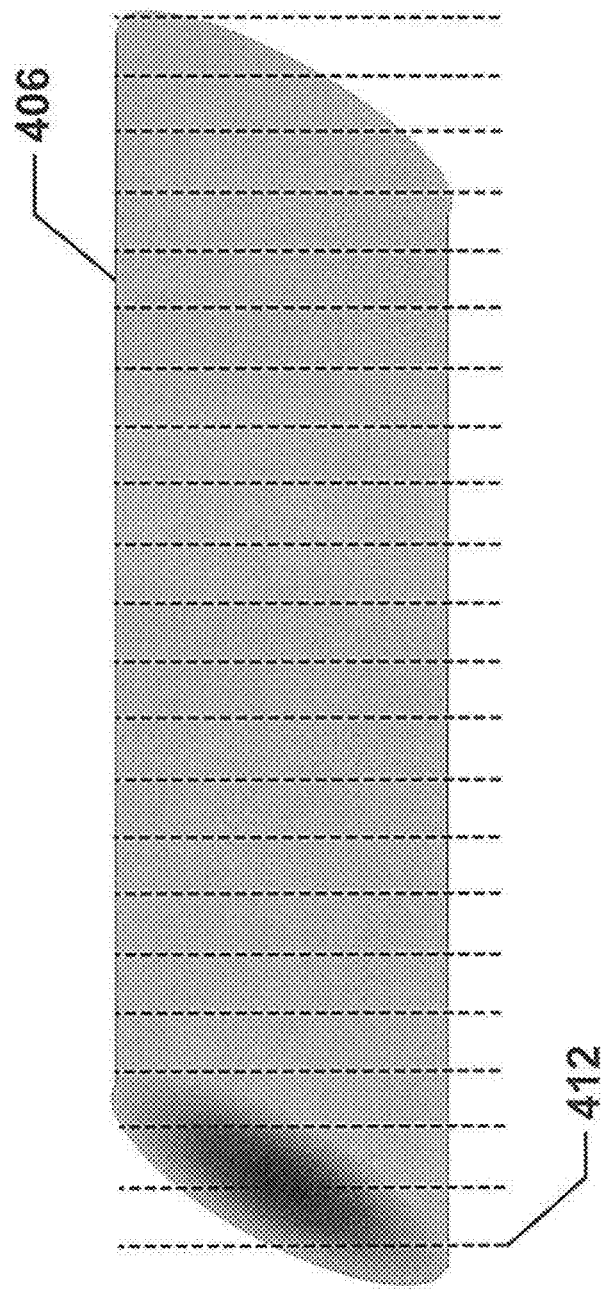
FIG. 13 illustrates a block diagram of a volumetric analysis of light packets in accordance with an embodiment of the invention.

FIG. 13 shows a close-up of the reflected light packet 406 subject to the volumetric analysis in accordance with various embodiments of the present invention. For purposes of the present invention, it will be understood that a volumetric analysis includes an analysis of a frame buffer corresponding to the LiDAR detectors that is performed for multiple points in time or samples within that frame buffer such that there are multiple periodic samples that may be evaluated to reconstruct and analyze the reflected light energy. For example, the vertical lines 412 represent a periodic sampling of the reflected light by the LiDAR detector sampling circuitry 86 as shown, for example, in FIG. 10. At each sampling time a frame buffer is created that constitutes a multi-bit intensity value for each discrete detector in the detector array.

By utilizing volumetric reconstruction and analysis of the reflected light packet 406, embodiments of the present invention can determine more information about the surface characteristics of the object than in the flash LiDAR case as shown in FIG. 9. Changes in the energy distribution along the axis of the light packet will yield information about the contour of the surface. Transformations of the energy distribution between the characterized incident wave and the reflected wave will yield information about the texture of the surface.

A sample comparison of surface angle measurements for first return system of conventional flash LiDAR and a GPU-based volumetric analysis in accordance with various embodiments of the present invention highlights this difference. For this sample comparison, assume:

1) the speed of light is 0.3 mm/picosecond,
2) a 10 picosecond period sampling clock,
3) incident energy contacting a sloped surface of 8 degrees from the normal vector,
4) incident light circular field of view of diameter 4 centimeters, and
5) a detector grid of 5×5 that covers the field of view of the returned signal.

With these assumptions, the first-return system of conventional flash LiDAR systems will obtain only one sample during the leading-edge portion of a returned light energy. The values in the detector array of the conventional Flash LiDAR system will be unable to resolve a difference between the eight-degree sloped surface and a 0.5 degree sloped surface. The error in this case would be approximately +/−4 degrees. In contrast, the GPU-based system with volumetric analysis in accordance with various embodiments of the present invention utilizes the leading edge sample and at least one steady state sample during the period of the light pulse to determine the angle of the measured surface to +/−1.5 degrees.

Figure 14:
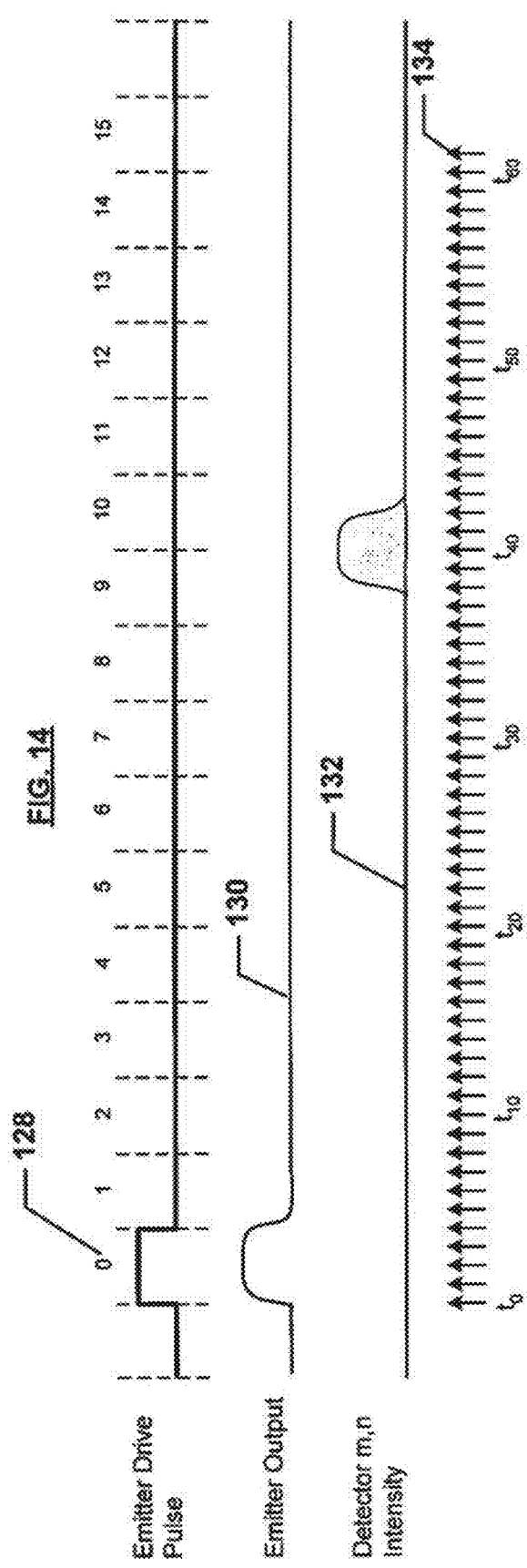
FIG. 14 illustrates electrical and optical signal timing for a single-object return.

FIG. 14 shows the timing diagram for the sampling of the detectors for a single object. The emitter drive pulse activates the emitter output 130 at emitter time $t_0$ 128. There are 48 samples acquired for this emitter/detector cycle, denoted as times $t_0$ through $t_{47}$ on the detector sampling timeline 134. The intensity of the reflected light at the detector elements is shown as detector m,n intensity 132. In the frame buffer block 136, there is a frame buffer for each detector sample event. Each frame buffer contains a multi-bit value for each detector in the array. For a device that has M*N detectors and A/D converters with L bits, each frame buffer will have M*N*L bits. If K represents the number of samples per detector cycle, the frame buffer block 136 will contain M*N*L*K bits.

FIG. 15 displays frame buffers for three sample times for the single-object example. The first frame buffer 140 is for $t_{38}$, the second frame buffer 144 is for times $t_{39}$ through $t_{41}$, and the last frame buffer 148 is for $t_{42}$. The values in each cell correspond to the sampled intensity value for each detector element. The 3D surfaces 156, 158, 160 graphically show the contents of the frame buffers 140, 144, 148 where each element on the xy plane of the graph 138, 142, 146 represents a detector in the array and the z value (height) of the surface 156, 158, 162 represents the intensity value of each element in the array. The surface representations can be important since some of the techniques described herein will utilize numerical analysis to perform comparisons between the characterized emitter profile and the detected frame buffer profiles.

Frame buffer $t_{38}$ 140 establishes the time of first return as t=37.5 time periods. Utilizing Eq. 1 and Eq. 2 yields the $D_{sample}$ for this object, which is the length of the optical path from the emitter to the object and back to the detector array. With a characterized emitter at a known central angle, a characterized beam profile and a known $D_{sample}$ the theoretical reflected beam profile can be compared to the sampled profile. If m,n(k) represents the detector frame buffer at time k and m,n($D_{sample}$) represents the expected frame buffer values for the emitter as received from a normal object of constant intensity at distance $D_{sample}$, the ratio of sampled to expected values for each detector can be expressed as:

$$\text{Ratio}_{m,n} = m,n(D_{sample})/m,n(k) \quad \text{(Eq. 7)}$$

The expected frame buffer in this embodiment will typically cover a small percentage of the elements in a detector frame buffer since the field of view of the emitted beam will usually be rather small compared to the detector array field of view. The area of interest for Eq. 7 will be confined to those pixels that have an expected value that is non-zero and above a defined threshold. Having established the localized ratios of actual values to expected values, the processing algorithm can identify the pixels with a constant ratio within the expected value array. These constant-ratio pixels will be grouped together as being from the same surface. For constant-ratio analysis the ratios of the pixels do not need to be equivalent. The ratio analysis may search for pixel ratios that fall within a defined range based on the pixel ratios from neighboring pixels. The analysis of near-constant ratios to determine surfaces is referred to as segmentation and will be utilized in subsequent examples.

Constant-ratio segmentation analysis, such as in accordance with Eq. 7, can utilize a somewhat large intensity range for grouping pixels together on the same object or surface. Object qualities like surface texture, color, and temperature will result in varying reflective characteristics on the surface of the object. As a result, the intensity values in the frame buffer will vary accordingly. Analysis that utilizes a large range for constant-ratio segmentation can be expanded to include analysis and identification of the surface qualities like texture, color, temperature, and density.

Figure 16:
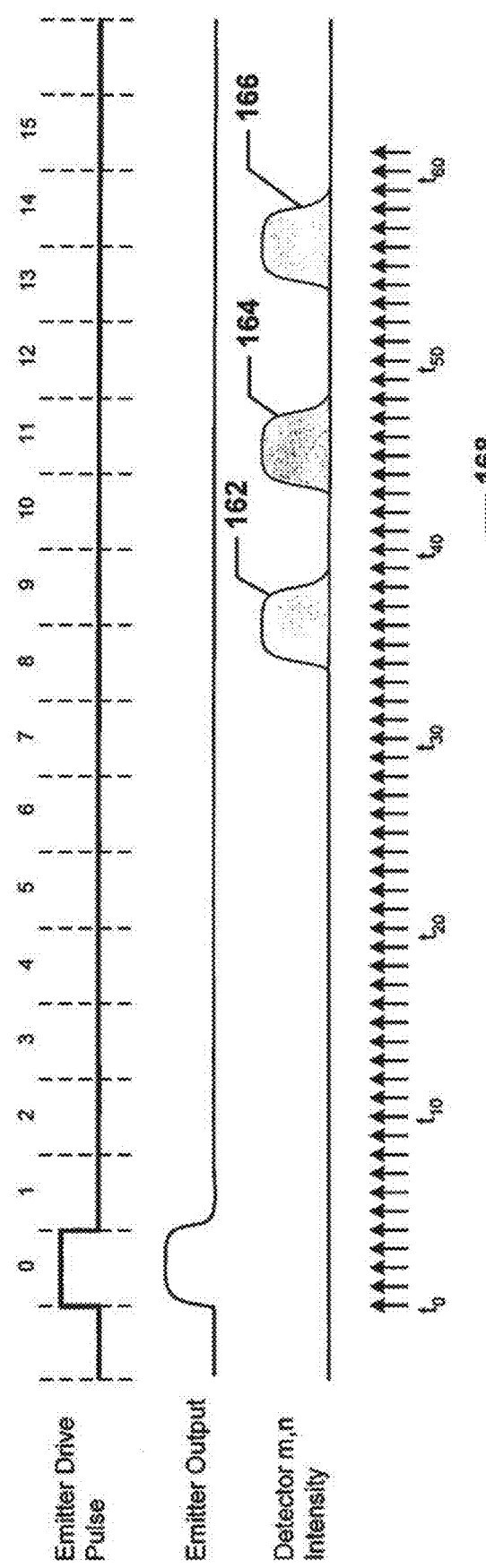
FIG. 16 illustrates electrical and optical signal timing for a multiple-object return.

In another embodiment, the incident beam location from FIG. 6 may be utilized, but this time with the single emitter, multi-detector system configuration from an embodiment of the present invention in accordance with FIG. 12. FIG. 16 shows the timing diagram of the multi-object scene. Three distinct packets of light 162, 164, 166 are sampled by the detector array.

FIG. 17 shows the partial frame buffers at three different sampling times for this embodiment. The first frame buffer 170 is for $t_{35}$ and shows the intensity values corresponding to the traffic sign. The 3D surface 172 graphically shows the intensity values and shows the peak intensity 182 associated with the traffic sign. Segmentation analysis using Eq. 7 identifies an object that resides in the lower portion of the frame buffer 170. The peak value 188 of the segmented object is determined and the intensity value of 137 is identified.

The partial frame buffer 174 in the middle of FIG. 17 is for $t_{45}$ and shows the intensity values corresponding to the foreground building. The 3D surface 176 graphically shows the intensity values and shows the peak intensity 184 associated with the foreground building. Segmentation analysis using Eq. 7 identifies an object that resides in the upper right portion of the frame buffer 174. The peak value 190 of the segmented object is determined and the intensity value of 84 is identified.

The partial frame buffer 178 at the bottom of FIG. 17 is for $t_{55}$ and shows the intensity values corresponding to the background building. The 3D surface 180 graphically shows the intensity values and shows the peak intensity 186 associated with the background building. Segmentation analysis using Eq. 7 identifies an object that resides in the upper left portion of the frame buffer 178. The peak value 192 of the segmented object is determined and the intensity value of 66 is identified.

For each of the three objects detected within the frame buffers in FIG. 17, the peak detector intensity was identified. The peak intensity is used to determine the reported intensity of the object.

$$\text{Intensity}_{[object](m,n)} = \frac{A * I_{max} * I_{[m,n]}(k)}{I_{[m,n]}(D_{sample})} \quad \text{(Eq. 8)}$$

where $\text{Intensity}_{[object](m,n)}$ is the computed intensity of the object with a peak intensity
  value at location (m,n)
A is a scaling factor that depends on the efficiency of the
  device
$I_{max}$ is the maximum value allowed for the computed
  intensity
$I_{[m,n]}(k)$ is the measured intensity value for location m,n
  in the frame buffer for time k
$I_{[m,n]}(D_{sample})$ is the expected intensity value for location
  m,n at an object distance of $D_{sample}$ Since the typical beam from an emitter is diverging, objects farther from the emitter will receive less incident radiation than those objects closer to the emitter. The angular characterization of each emitter will establish the intensity of the emitted beam throughout the emitter's field of view. For every object distance, simple geometry may be used to compute the incident radiation (using an interpolation method for an actual angle between two discrete angles in our light source characterization and calibration) hitting the actual object.

In the determination of the reported intensity of an object, in various embodiments the processing system knows how much incident radiation intersects with the object and how much retroreflected radiation is returned toward the photon source. An "ideal retroreflector" is an object that reflects all incident photons back toward the source of the photons. For every object distance, there will be an expected return signal for the ideal retroreflector. This expected return signal is a function of the emitter characterization (the diverging angles throughout the emitter field of view), the device calibration (the angular and intensity adjustments due to the medium), and the distance to the object. The intensity conversion from the detector intensities to the reported intensity of an object is governed by the $I_{[m,n]}(D_{sample})$ term of Eq. 8.

Figure 18:
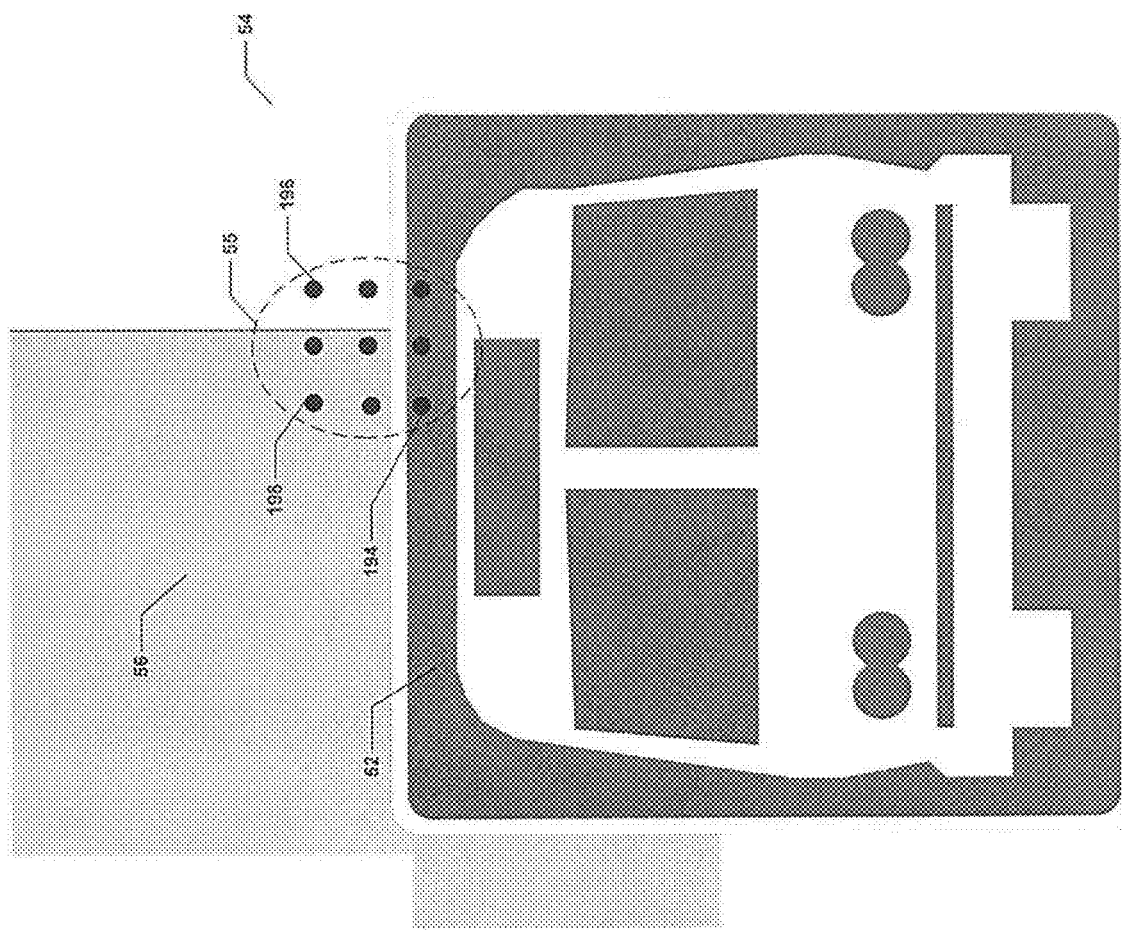
FIG. 18 illustrates a regular grid of LiDAR points for a multiple-object return.

FIG. 18 shows a zoomed in view of the traffic sign 52, foreground building 54, background building 56, and location 55 of the emitted light beam. In this embodiment, a 3×3 grid of points has been established within the emitter field of view. Each of these distinct points defines a vector along which the system will report an object point, and each point will typically be aligned with a defined value of m and n within the detector frame buffer. The values of m and n for the points in the 3×3 grid can be integer or floating point values whereby integer values will align the projected point angle with the center angle of detector m,n while floating point values define the projected point angles that are interpolated from the center angles of the nearby detectors.

The lower left point 194 is at a known (from Eq. 5) distance $D_{[reflected](m,n)}$ and angle (from aligned or interpolated center angles of the detector) and has a reported intensity from Eq. 8. Therefore, all necessary information is obtained to treat the point 194 as an independent LiDAR point measurement on the object 52. The two other points on the sign 52 are treated as independent points. They will each have the same intensity and distance as the lower-left point 194, but each will have their own angle depending on the detector value(s) along which they are aligned.

The upper right point 196 in the field of view 55 of the emitted beam is reflected from the foreground building 54 and has a known distance, angle, and reported intensity. Therefore, all necessary information is obtained to treat the point 196 as an independent LiDAR point measurement on the object 54. The other point on the foreground building 54 is treated as an independent point. It will have the same intensity and distance as the upper-right point 196, but will have its own angle depending on the detector value(s) along which it is aligned.

The upper left point 198 in the field of view 55 of the emitted beam is reflected from the background building 56 and has a known distance, angle, and reported intensity. Therefore, all necessary information is obtained to treat the point 198 as an independent LiDAR point measurement on the object 56. The other three points on the background building 56 are treated as independent points. They will all have the same intensity and distance as the upper-left point 198, but each will have their own angle depending on the detector value(s) along which they are aligned.

The example in FIG. 18 utilizes a regularly-spaced 3×3 grid of output points. One skilled in the art can establish other configurations for output points using a regular or non-regular, symmetric or non-symmetric grid. The essential elements are that each point has a computed distance, angle and intensity value.

FIG. 19 shows the output data structure 200 for the regular grid of points in the roadside scene. This data structure 200 is utilized to communicate with the upstream application or device that is utilizing the LiDAR point data. The data structure 200 format and layout are typically defined in the device interface specification for the LiDAR device. The data elements for each point 202 are the angle 204, distance 206, intensity 208 and time 210.

Figure 20:
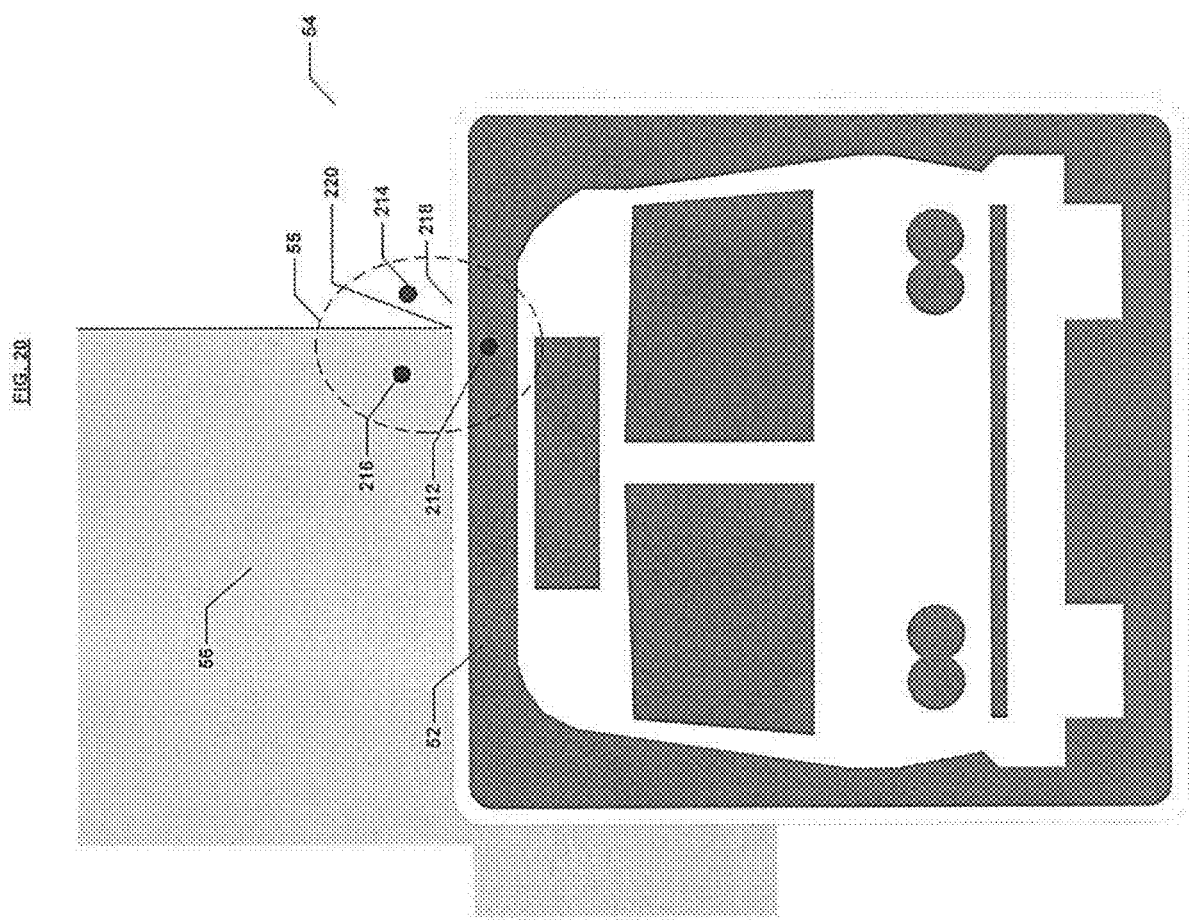
FIG. 20 illustrates object locations of LiDAR features for a multiple-object return.

FIG. 20 shows a zoomed in view of the traffic sign 52, foreground building 54, background building 56, and location 55 of the emitted light beam. Five distinct features are shown—three point features 212, 214, 216; one edge feature 218; and one corner feature 220. Although the number of features reported is fewer than the 3×3 grid case, more information can be communicated to upstream applications by utilizing fewer feature points.

The point location 212 that corresponds to the sign 52 has a computed angle (from the center angle of the detector m,n), a computed distance $D_{[reflected](m,n)}$, and an intensity. The detector m,n utilized for the angle determination will be defined during the segmentation analysis of the frame buffers. The selected detector can be the geometric mean of the segmented object of near-constant ratio, the weighted mean of the segmented object, or some other determination of detector, either fixed point or floating point, that properly describes the angle for this segmented and detected object. Point location 216 corresponds to the background building and point location 214 corresponds to the foreground building, with each having a computed angle, distance and intensity.

An edge feature 218 is detected in the frame buffer segmentation analysis. Communicating this detected feature to the upstream application will enable more advanced analysis and/or reconstruction of the scene than standard point reporting. The edge feature is described by a projection angle defined by the detector that establishes the edge location during segmentation, by an edge angle that defines the slope of the edge feature relative to the detector array field of view, and by the distance to the object that contains the edge feature.

A corner feature 220 is detected in the frame buffer segmentation analysis. Communicating this detected feature to the upstream application will enable more advanced analysis and/or reconstruction of the scene than standard point reporting. The corner feature is described by a projection angle defined by the detector that establishes the corner location during segmentation, by a first edge angle that defines the slope of the first edge feature relative to the detector array field of view, a second edge feature that defines the slope of the second edge feature relative to the detector array field of view, and by the distance to the object that contains the corner feature.

FIG. 21 shows the output data structure 222 for the feature types identified from FIG. 20. Since the information reported to upstream applications is no longer only in point form, a new parameter (feature) is established. In this embodiment, each feature has a feature_type attribute. For feature f 224, which corresponds to the road sign, the feature_type is <point> 226, signifying that the data element describes a point feature. The proj_angle 228 is the projection angle from the device to the feature, expressed in degrees or radians relative to the device normal vector. The distance 230 is the computed distance to the feature 224, the intensity 231 is the computed intensity from Eq. 8, and the time 232 is the system time at which the measurement took place. The data elements for the foreground building—feature f+1 of feature_type <point>—and the background building—feature f+2 of feature_type <point>—are shown in the output data structure 222.

The detected edge of the sign is shown as feature f+3. The feature_type is <edge> 234 and the proj_angle is the angle of the detector aligned with the midpoint of the edge feature. The edge_angle 236 is the slope of the edge relative to the detector array field of view. The detected corner of the intersection of the three objects is shown as feature f+4. The feature_type is <corner> 238 and the proj_angle is the angle of the detector aligned with the corner feature. The edge_angle0 240 is the slope of the first edge relative to the detector array field of view. The edge_angle1 242 is the slope of the second edge relative to the detector array field of view.

Segmentation analysis may be utilized to determine features like edges and corners. Although not shown by example, one skilled in the art can utilize segmentation to determine other second-order and third-order object edge features like arcs, splines, Bezier curves, etc. While various examples of segmentation to report 2D edge features like edges and corners have been described, it will be understood by a person skilled in the art that other segmentation approaches may also analyze frame buffers and report other 2D edge feature types.

Figure 22:
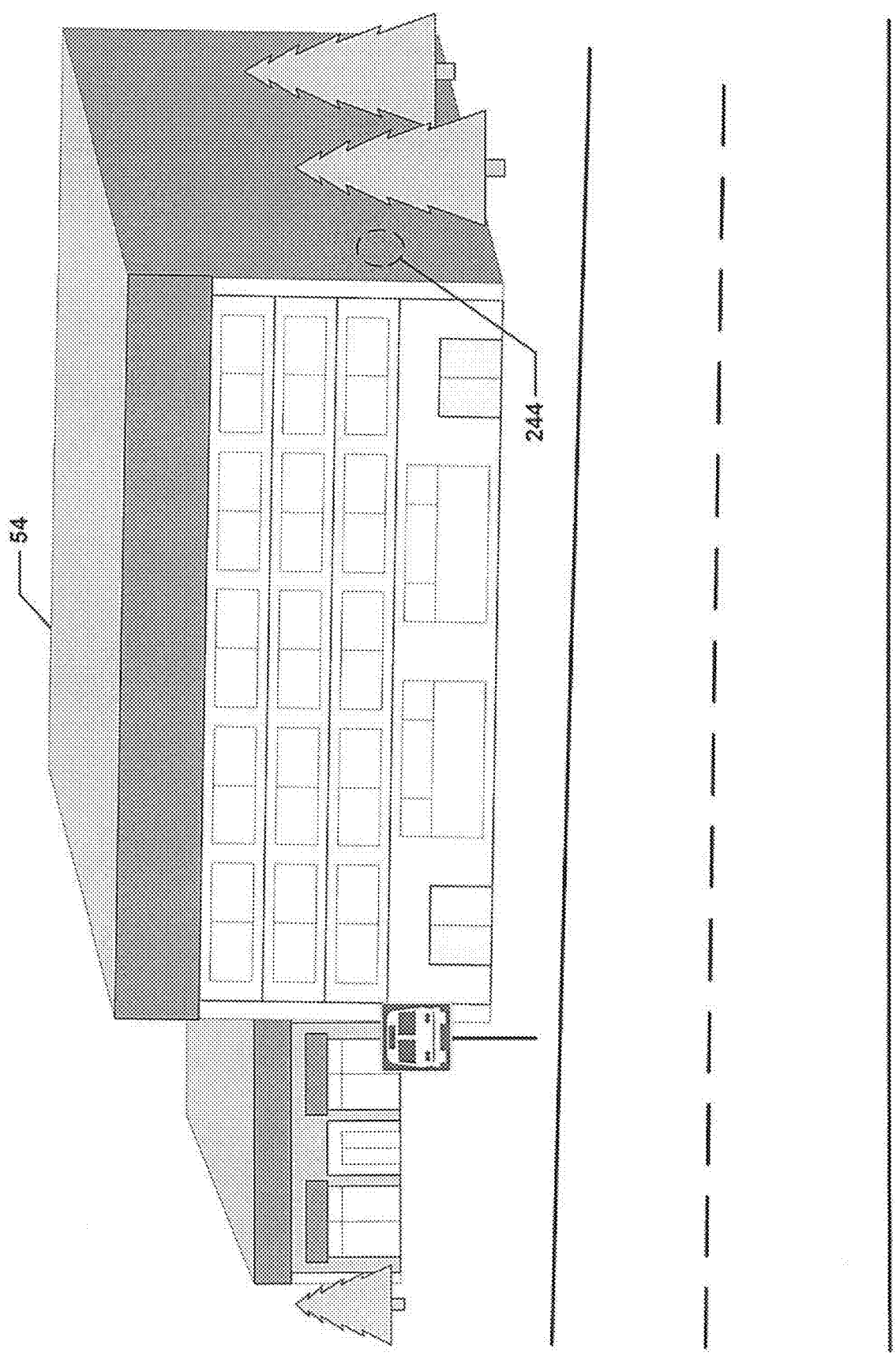
FIG. 22 illustrates a roadside scene with an area of interest on a non-normal surface.

FIG. 22 shows the roadside scene once again. The field of view 244 of an emitted beam is on the side of the foreground building 54. The surface of the building 54 is likely uniform intensity, but the normal vector to the building 54 side is not aligned with the normal vector of the LiDAR device. For the non-normal building side, photons from the emitter will reach the building at the left side of the emitter field of view before they reach the building at the right side of the field of view. In turn, the return paths for photons on the right side will be longer than those return paths on the left side. Stated another way, the $D_{[sample](m,n)}$ values will be lower for detectors on the left side of the returned signal than they will be on the right side.

Figure 23:
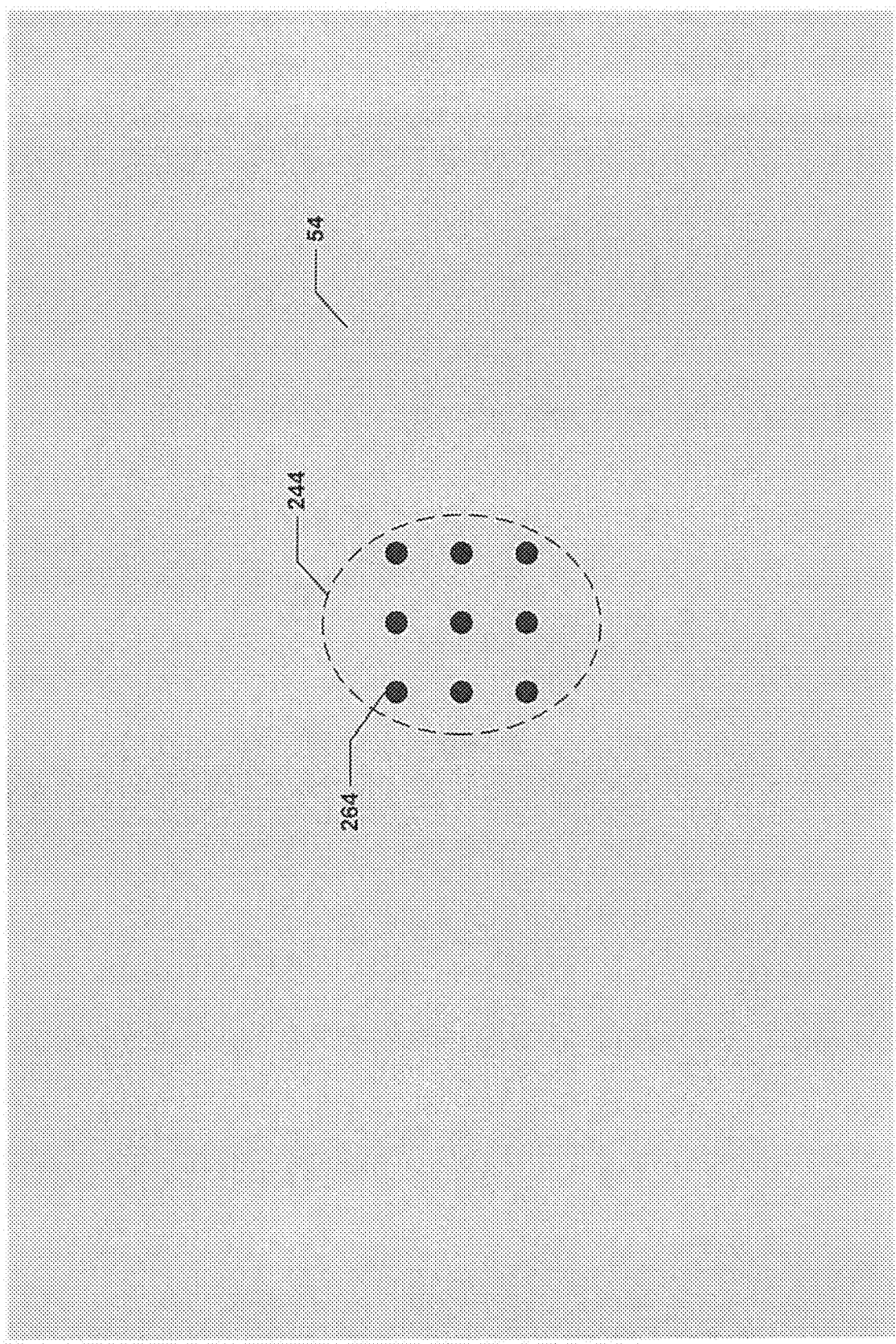
FIG. 23 illustrates a regular grid of LiDAR points for a single, non-normal object return.

FIG. 23 is a close-up view of the foreground building 54 with uniform intensity characteristics and a building side that is non-normal to the LiDAR device in accordance with embodiments of the present invention. The emitter field of view 244 is shown along with the points that will be established for a 3×3 grid of points. Each of the grid points is associated with a detector m,n in the detector array, and each of the points has a different $D_{[sample](m,n)}$. Utilizing Eq. 5 determines the $D_{[reflected](m,n)}$ for all of the nine grid points. The data structure for reporting the 3×3 grid of points may be identical to FIG. 19.

Analysis of frame buffers at the leading and trailing edges of return packets will yield information about the angle of the side of the building. FIG. 24 shows three frame buffers 246, 250, 254 for the sampled reflections from the building side. Segmentation analysis of the steady-state frame buffer 250 determines that there is a single object of near-uniform intensity. Furthermore, frame buffer analysis determines there are no signal returns at other sampling times throughout the emitter/detector cycle. The leading-edge frame buffer 246 is a collection of sampled values for all detectors at a sampling time that is early in the received packet cycle. Using Eq. 7 the ratio is computed for all detectors in the leading-edge frame buffer 246. Analysis of the frame buffer ratio map identifies a detector 258 at which the ratio is a maximum. This maximum-ratio location is labeled m,$n_{MaxRatio}$(leading).

In various embodiments, the steady-state frame buffer 250 corresponds to a sample time that is in the middle of the return packet. These steady-state values are experiencing small variations from sample to sample since they reflect time periods whereby all of the incident photons are intersecting with the object throughout the emitter field of view and all reflected photons throughout the field of view. Using Eq. 7 the ratio is computed for all detectors. If the surface of the intersecting object has uniform reflectivity and a constant normal vector throughout the emitter field of view, the ratio analysis on the steady-state frame buffer should yield relatively constant ratios throughout the relevant detector area. The detector of maximum intensity 260 will have a ratio at steady state that is consistent with the ratios of neighboring detectors.

The trailing-edge frame buffer 254 is a collection of sampled values for all detectors at a sampling time that is late in the received packet cycle. Using Eq. 7 the ratio is computed for all detectors in the trailing-edge frame buffer 254. Analysis of the frame buffer ratio map identifies a detector 262 at which the ratio is a maximum. This maximum-ratio location is labeled m,$n_{MaxRatio}$(trailing).

Having determined the locations of the maximum ratios of the leading and trailing edges of the received packet, the processor can compute the normal vector for the object surface.

$$uvw = 2*D_1*\sin[(\text{angle-}m_2-\text{angle-}m_1)/2],$$

$$2*D_1*\sin[(\text{angle-}n_2-\text{angle-}n_1)/2],$$

$$\sqrt{[u\text{-comp}^2+v\text{-comp}^2+(D_2-D_1)^2]}*\tan[90-\tan^{-1}((D_2-D_1)/\sqrt{(u\text{-comp}^2+v\text{-comp}^2)})]\} \quad \text{(Eq. 9)}$$

Where $D_1 = D_{[reflected](m,n)}$ for m,$n_{MaxRatio}$(leading),
$D_2 = D_{[reflected](m,n)}$ for m,$n_{MaxRatio}$(trailing),
Angle-$m_1$ is the x component of the angle for m,$n_{MaxRatio}$ (leading),
Angle-$m_2$ is the x component of the angle for m,$n_{MaxRatio}$ (trailing),
Angle-$n_1$ is the y component of the angle for m,$n_{MaxRatio}$ (leading),
Angle-$n_2$ is the y component of the angle for m,$n_{MaxRatio}$ (trailing),
u-comp is the u component of the uvw notation for Eq. 9
v-comp is the v component of the uvw notation for Eq. 9

The determination of maximum-ratio locations in the detector array depends on a sufficiently high sampling rate for the detectors. For sampling rates that are somewhat lower than ideal, extrapolation is used to establish accurate maximum-ratio locations. For example, a sampling system that captures a single frame buffer during the "ramp-up" part of the cycle, a single frame buffer during the "ramp-down" part of the cycle, and multiple steady state frame buffers will underestimate the locations of maximum ratios for both the leading and trailing edges. For a "ramp-up" frame buffer the location of the sample in time can be estimated by comparing the additive intensity of the ramp-up frame buffer to the additive intensity of the steady-state frame buffer.

$$Pct(\text{leading}) = \frac{\Sigma \text{ Intensity}_{m,n}(\text{ramp-up})}{\Sigma \text{ Intensity}_{m,n}(\text{steady-state})} \quad \text{(Eq. 10)}$$

where Pct(leading) is the percentage of leading edge time that has elapsed from the start of the leading edge of the light packet until the sampling of the ramp-up frame buffer.
Intensity$_{m,n}$(ramp-up) is the intensity value of location m,n in the ramp-up frame buffer.
Intensity$_{m,n}$(steady-state) is the intensity value of location m,n in the steady-state frame buffer.

The Pct(trailing) number is obtained in a similar way by computing the ratio of the additive intensity of the ramp-down frame buffer to the additive intensity of the steady-state frame buffer. Using Eq. 10 for leading and trailing end percentages, the maximum ratio locations can be determined by:

$$m_{MaxRatio}(\text{leading}) = \quad \text{(Eq. 11)}$$
$$m_{r-u} - (m_{r-u} - m_{r-d}) * \frac{Pct(\text{leading})}{Pct(\text{leading}) + Pct(\text{trailing})}$$

$$n_{MaxRatio}(\text{leading}) = \quad \text{(Eq. 12)}$$
$$n_{r-u} - (n_{r-u} - n_{r-d}) * \frac{Pct(\text{leading})}{Pct(\text{leading}) + Pct(\text{trailing})}$$

$$m_{MaxRatio}(\text{trailing}) = \quad \text{(Eq. 13)}$$
$$m_{r-u} + (m_{r-u} - m_{r-d}) * \frac{Pct(\text{trailing})}{Pct(\text{leading}) + Pct(\text{trailing})}$$

-continued $$n_{MaxRatio}(\text{trailing}) = \quad \text{(Eq. 14)}$$
$$m_{r-u} + (m_{r-u} - m_{r-d}) * \frac{P_{ct}(\text{trailing})}{P_{ct}(\text{leading}) + P_{ct}(\text{trailing})}$$

where $m_{r-u}$—is the horizontal component of the max-ratio location in the ramp-up frame buffer $n_{r-u}$—is the vertical component of the max-ratio location in the ramp-up frame buffer $m_{r-d}$—is the horizontal component of the max-ratio location in the ramp-down frame buffer $n_{r-d}$—is the vertical component of the max-ratio location in the ramp-down frame buffer The extrapolated MaxRatio locations for the leading and trailing edges are utilized in Eq. 9 to determine the normal vector for the surface of the object.

Figure 25:
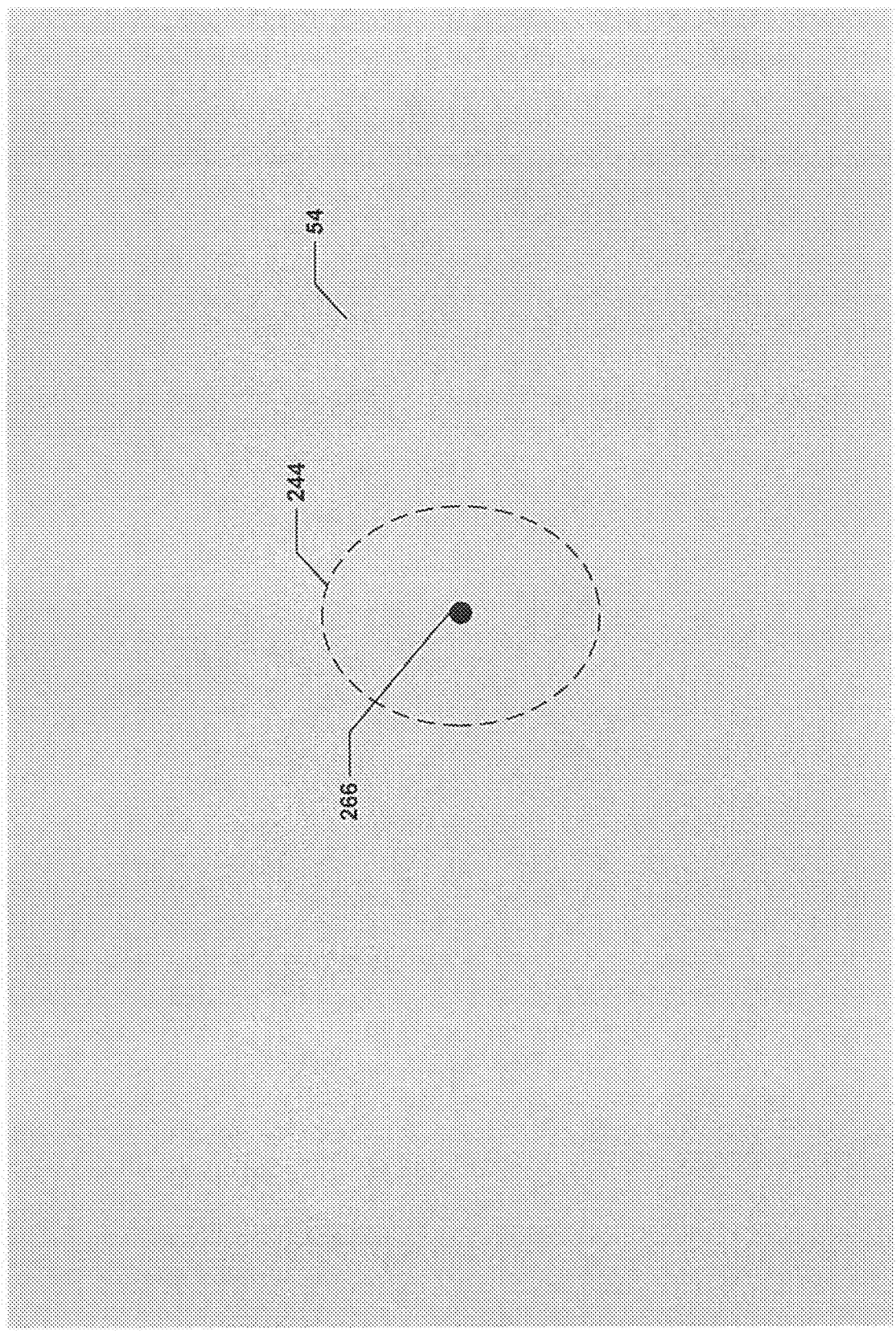
FIG. 25 illustrates object locations of LiDAR features for a single, non-normal object return.
Figure 26:
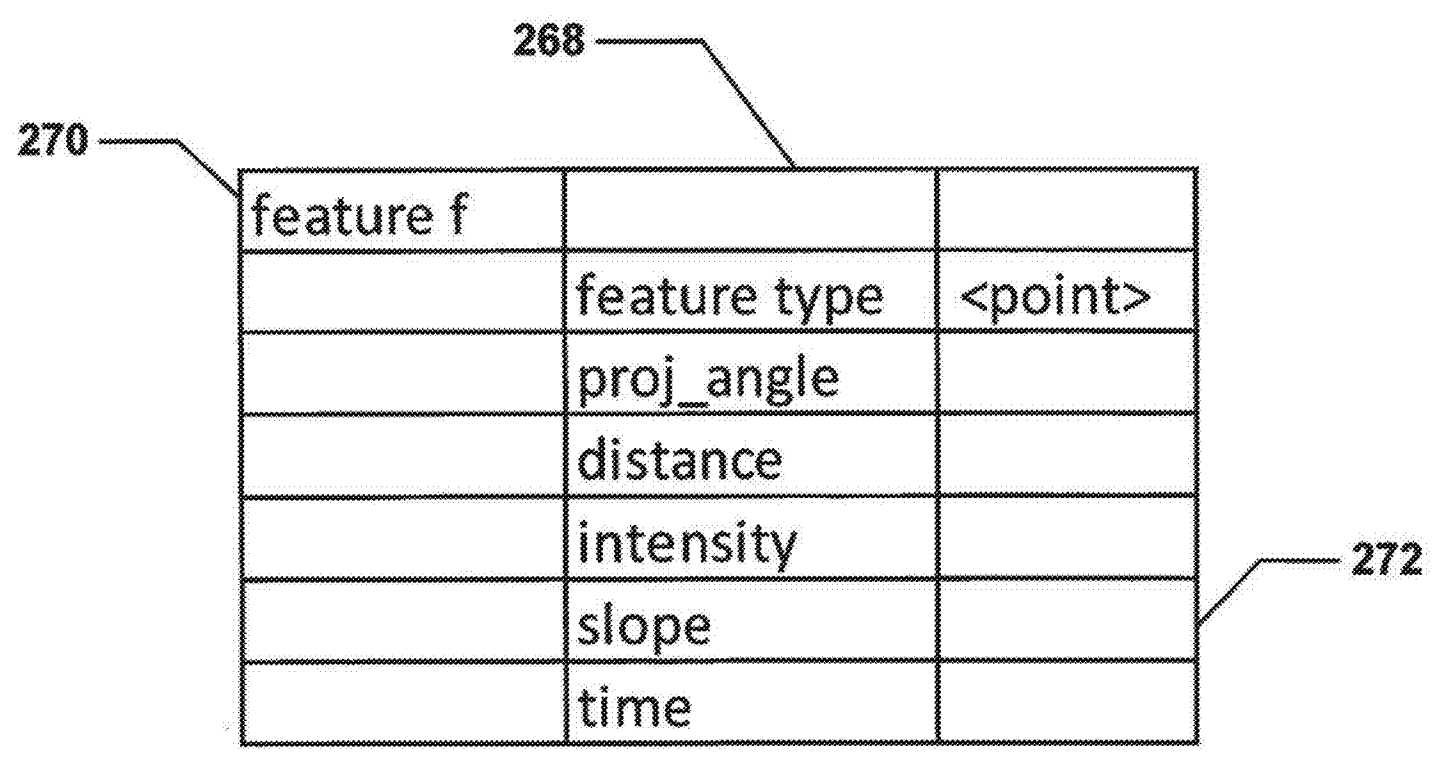

FIG. 25 shows the close-up view of the side of the foreground building 54 with the emitter field of view 244. The center of the emitter field of view 244 will be the detector that is utilized for reporting the values in the output data structure. FIG. 26 shows the data structure for a feature 270 that is a type point that has a projection angle, distance, intensity, and time. Furthermore, the slope attribute 272 reports the slope of the normal surface of the object relative to the normal vector of the device. The slope attribute 272 can be stored and reported using uvw nomenclature.

Figure 27:
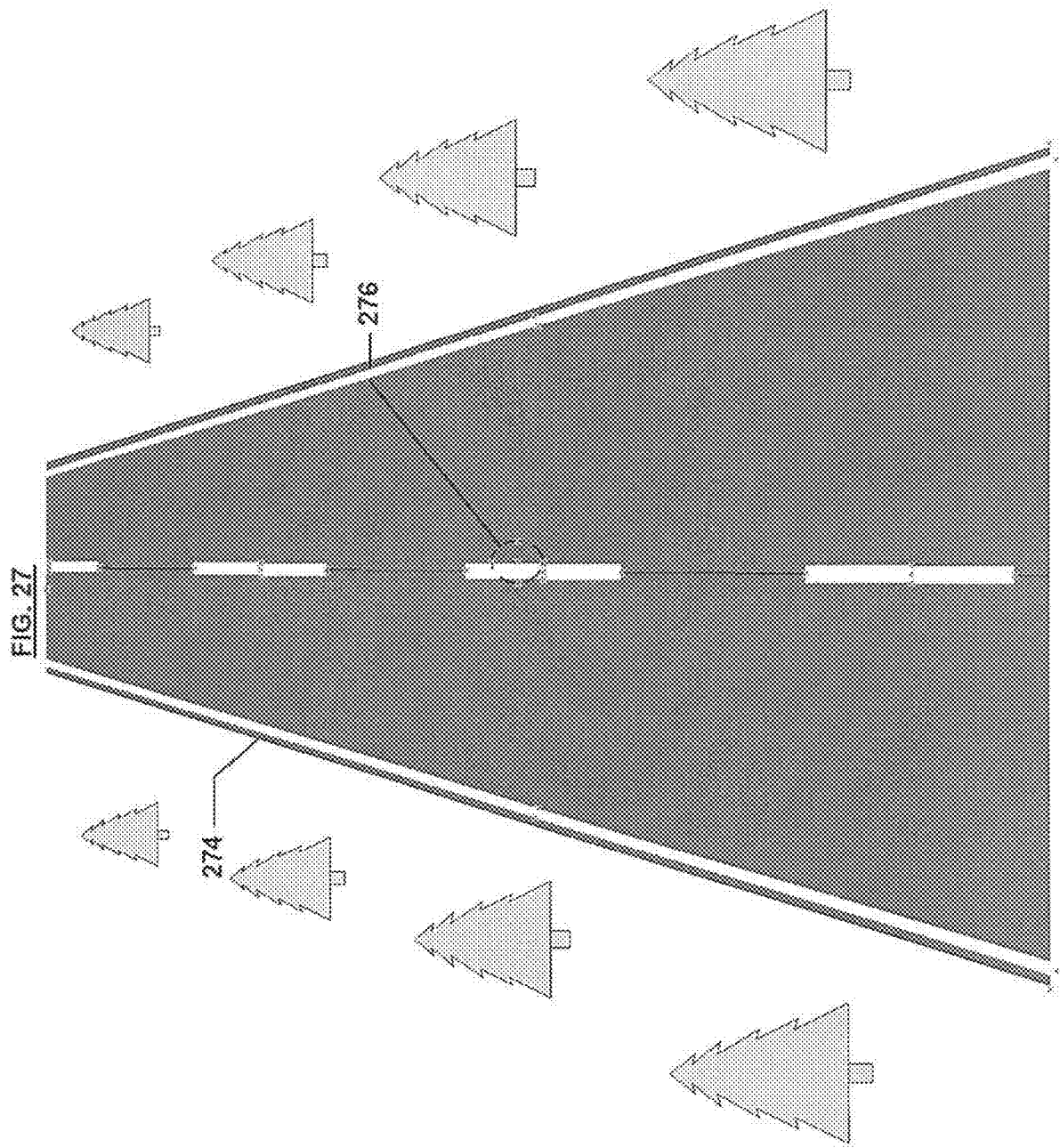
FIG. 27 illustrates a scene with a non-normal surface with an area of interest encompassing surfaces of varying intensity.

FIG. 27 shows a typical two-lane roadway 274 as imaged from a LiDAR device in accordance with embodiments of the present invention on a vehicle that is traversing the roadway 274. The field of view 276 of an emitter is shown partially intersecting the center line and partially intersecting the bare road 274 surface.

Figure 28:
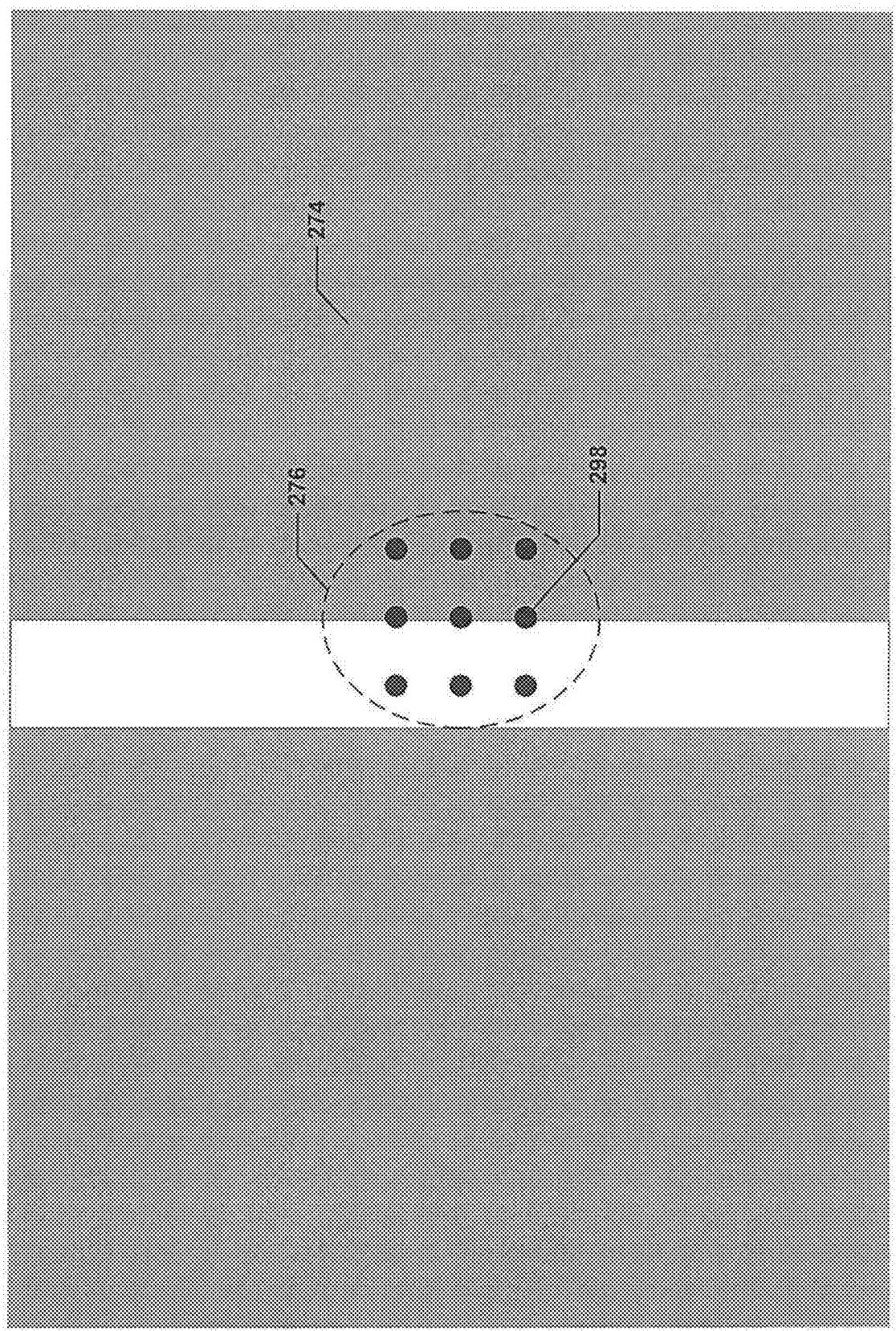
FIG. 28 illustrates a regular grid of LiDAR points for multiple, non-normal object returns.

FIG. 28 is a close-up view of the roadway 274 with two surfaces of different intensities. The emitter field of view 276 is shown along with the points that will be established for a 3×3 grid of points. Each of the grid points is associated with a detector m,n in the detector array, and each of the points has a different $D_{[sample](m,n)}$. Utilizing Eq. 5 determines the $D_{[reflected](m,n)}$ for all of the nine grid points. The data structure for reporting the 3×3 grid of points is identical to FIG. 19. The middle column of the 3×3 grid of points lies along the intersection of the two surfaces. As a result, the reported intensity values for these three point features will be somewhere between the intensity values reported by the leftmost and rightmost columns. The grid method of reporting output points has not utilized segmentation up to this point. However, segmentation analysis could be utilized to eliminate grid points that lie on or near segment boundaries or to change the location of the reported points so the reported intensity value is closer to the value of the actual object surface.

FIG. 29 shows a ramp-up frame buffer 278, a steady-state frame buffer 280 and a ramp-down frame buffer 282 for the sampled road surface return signal. Frame buffer analysis determines that no other return packets resulted from this emitter sequence. Using segmentation analysis on the steady-state frame buffer 280 determines that two distinct surfaces exist within the field of view. The dashed line separating the distinct regions of interest 290 is the separating line that will be used to independently determine the slope of each surface.

The ramp-up frame buffer 278 shows the MaxPoint 284 of the more reflective object surface on the left side of the frame buffer 278. The ramp-down frame buffer 282 shows the MaxPoint 288 of the same reflective surface. By using Eq. 10, Eq. 11 and Eq. 9 the slope of the left-most object surface is determined. For all three equations, the range of m and n values is constrained to those values that lie within the object boundaries established by the segmentation analysis.

Having determined all of the attributes for the left-most object surface, the processor will now establish the attribution for the right-most, less-reflective surface. Once again, segmentation analysis determines the bounding area within the frame buffers that is defined by the object surface edge and emitter field of view. The ramp-up frame buffer 278 shows the MaxPoint 292 of the less reflective object surface on the right side of the frame buffer 278. The ramp-down frame buffer 282 shows the MaxPoint 296 of the same reflective surface. By using Eq. 10, Eq. 11 and Eq. 9 the slope of the right-most object surface is determined. For all three equations, the range of m and n values is constrained to those values that lie within the object boundaries established by the segmentation analysis.

Figure 30:
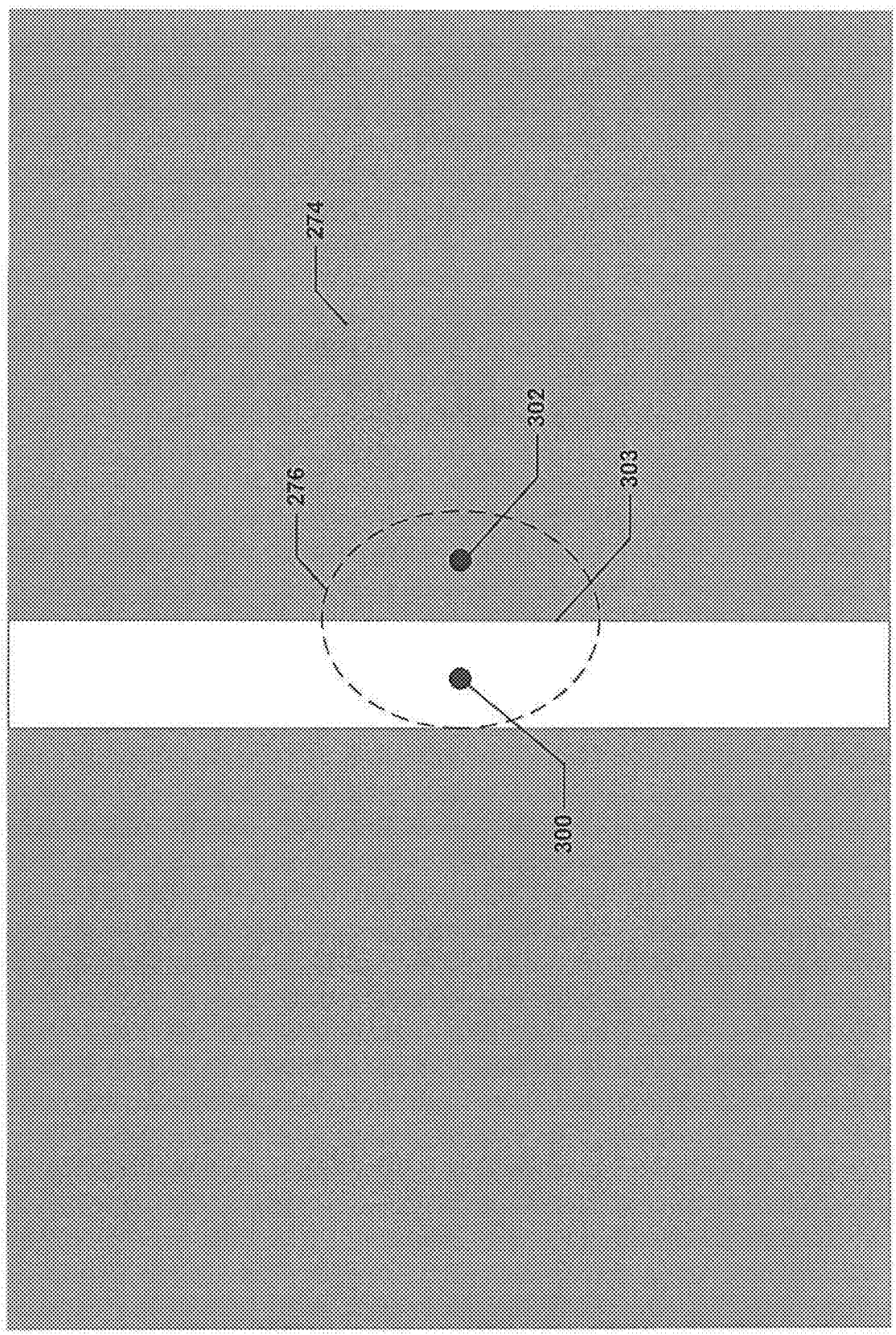
FIG. 30 illustrates object locations of LiDAR features for multiple, non-normal object returns.

FIG. 30 shows the close-up view of the road surface 274 with the emitter field of view 276. Segmentation analysis on the steady state frame buffer results in a reflective object 300 with an intensity, projection angle and distance. A less reflective object 302 has its own intensity, projection angle and distance. Each of the features 300, 302 has a slope determined by Eq. 9. The dividing line between the segmented objects is an edge feature that has a projection angle, distance and edge angle.

FIG. 31 shows the output data structure 304 for the features computed from this single emitter field of view. Feature f 306 is the point feature for the reflective surface, feature f+1 308 is the point feature for the less-reflective surface, and feature f+2 is the edge feature that defines the line that separates the two surfaces defined by the point features.

For LiDAR devices that operate on roadway vehicles and low-altitude flying vehicles, obstructions to light like fog and dirt cause attenuation problems with measurement of objects. Furthermore, devices that operate in a medium that is not completely transparent to the emitted radiation (like water) will attenuate the incident and reflected radiation. FIG. 32 shows a timing diagram for an emitter pulse and detector frame buffers for an embodiment of the present invention for a foggy environment or attenuating medium. The emitter sends a pulse to the environment at emitter time $t_0$ 312. The emitter output 314 is active for roughly the duration of emitter time $t_0$ 312. The detector intensities are shown with a low-level intensity 318 detected throughout the sampling cycle and a higher-intensity signal 316 detected later in the detector cycle. The low-intensity 318 signal has greater amplitude than the detector intensity prior to the start of emitter cycle, signifying that the detected signal is primarily a result of the incident radiation provided by the emitter. The relatively uniform low-level signal intensity throughout the detector cycle signifies that the translucent material interfering with a portion of the incident light is prevalent throughout the entire distance from the emitter to the object.

For a medium like air that contains fog or some other particulate that blocks a portion of the light, photons will be blocked for both the incident light and the reflected light. The blocking of the light by fog will result in incident light being reflected back to the detectors, being refracted along an axis that is not the original incident beam, and scattered randomly in the medium. The low-level intensity shown in FIG. 32 is primarily a result of the light reflected off the fog back to the detectors. Computing the area under the curve 318 of the low-level intensity will give an indication how much light is being blocked by the medium. The efficiency of the medium is estimated by:

$$Eff_{medium} = \frac{\text{\# of incident photons} - \text{\# of photons reflected by the medium}}{\text{\# of incident photons}} \quad \text{(Eq. 15)}$$

Utilizing variables from Eq. 8, the efficiency of the medium is expressed as:

$$Eff_{medium} = \frac{\Sigma\, I_{[m,n]}(D_{sample}) - \Sigma\, I_{[m,n]}(k)}{\Sigma\, I_{[m,n]}(D_{sample})} \quad \text{(Eq. 16)}$$

where $\Sigma I_{[m,n]}(D_{sample})$ is the sum of all of the expected intensity values for all distances from 0 to the distance at which the actual object is detected.

$\Sigma I_{[m,n]}(k)$ is the sum of all of the measured intensity values for all times up to but not including the times for which the actual object is measured.

Taking the medium efficiency into account, the computation for the object intensity is:

$$\text{Intensity}_{[object](m,n)} = \frac{A * I_{max} * I_{[m,n]}(k)}{Eff_{medium} * I_{[m,n]}(D_{sample})} \quad \text{(Eq. 17)}$$

where $\text{Intensity}_{[object](m,n)}$ is the computed intensity of the object with a peak intensity value at location (m,n)

A is a scaling factor that depends on the efficiency of the device $I_{max}$ is the maximum value allowed for the computed intensity $I_{[m,n]}(k)$ is the measured intensity value for location m,n in the frame buffer for time k $Eff_{medium}$ is the efficiency of the medium $I_{[m,n]}(D_{sample})$ is the expected intensity value for location m,n at an object distance of $D_{sample}$ FIG. 33 shows a timing diagram for an emitter pulse and detector frame buffers for an embodiment of the present invention in an environment like an autonomous vehicle whereby the LiDAR device is positioned behind a vehicle windshield that has dirt or some other foreign substance on the surface that is partially opaque to the wavelength of radiation being emitted. The emitter sends a pulse to the environment at emitter time $t_0$. The emitter output 320 is active for roughly the duration of emitter time $t_0$. The detector intensities are shown with a low-level intensity 324 detected for a short period of time that is roughly the elapsed time of the emitted pulse. The low-intensity 324 signal has greater amplitude than the detector intensity prior to the start of emitter cycle, signifying that the detected signal is primarily a result of the incident light provided by the emitter. The high-level detected signal 322 signifies that all of the incident and/or reflected light is not being blocked by the windshield. The efficiency of the medium for the dirty windshield is computed using Eq. 16, and the intensity of the reflected signal for the object is computed using Eq. 17.

FIG. 34 shows a flowchart for the processing of LiDAR return signals for the embodiment of FIG. 10. After device power up 330 the emitters and detectors are enabled 332, thus starting an emitter/detector cycle within the device. The GPU will wait 334 for the detector sequence to complete. In an embodiment there is a GPU for each emitter. The frame buffers for the device are typically large and cover a much wider field of view than that of a single emitter. Each GPU will only analyze those portions of the frame buffers that pertain to received signals from their companion emitter. As a way to localize the relevant frame buffer information, and as a technique for increasing the throughput of the device, each GPU will create local frame buffers 336 from the detector frame buffers by making a copy of the relevant portions of the detector frame buffers in a memory area of the GPU circuitry.

The GPU performs frame buffer analysis to locate the first return 338. Segmentation analysis 340 on the steady-state frame buffer is performed to isolate each of the possible detected objects. If multiple objects are detected 342 the GPU determines if there are corners 344. For any detected corners, the attributes are determined 346. Any remaining line features are attributed 348 and GPU processing resumes for the attribution of point features. Analysis of the leading-edge and trailing edge frame buffers for this return are used to determine the slope of each segmented object 350. The intensity of each segmented object 352 is computed, and the distances of all objects are computed 354. Upon completion of the processing for this frame buffer packet, the GPU determines if more return packets exist in the frame buffer 356. If there are more return packets 358 the GPU will resume steady-state segmentation analysis 340 on the next return packet.

Many of the embodiments have disclosed methods for increasing the resolution and feature reporting for a single emitter system. The examples have shown methods for increasing the resolution from one point per emitter pulse to N points per emitter pulse where N is the number of locations in the detector array along which output points will be defined. Other examples have shown how the value of information for a single point feature can be increased by computing the normal vector for the object surface. Yet other examples have shown how the inclusion of other feature types like edges and corners can increase the value of the reported information for a single emitter pulse.

Single emitter/detector systems can achieve increased resolution and/or feature reporting by replacing their paired emitter/detector circuitry with the single emitter/detector array embodiments contained herein. For example, the prior art system shown in FIG. 1 or FIG. 2 can replace the single photodetector with a detector array that covers a narrow field of view. With high-frequency sampling and a denser detector array the throughput (measured in number of output points per second) could be increased by a factor of 16 for a detector system whereby a 4×4 grid of output points was reported for each emitted beam.

U.S. Pat. No. 7,969,558, the detailed description of which is hereby incorporated by reference, discloses a device that utilizes 32 or 64 detector/emitter pairs that rotate about an axis, whereby the detector/emitter pairs do not have overlapping fields of view. This disclosed device can be improved dramatically by replacing each detector with a detector array, high-speed sampling circuitry, and processing to perform frame buffer analysis in accordance with various embodiments of the present invention. Such a device, while presently operating in the 700,000 point per second range with 32 or 64 emitter/detector pairs, could improve to over 17.5 million points per second if each detector were replaced with a detector array and the processing circuitry for each array reported 25 points for each emitter pulse.

Most of the disclosure has focused on the analysis of sampled waveforms due to a single emitter. In order to achieve maximum benefit, the methods and systems described herein will typically be practiced with a relatively dense detector array and multiple emitters. Each of the emitters may typically have non-overlapping fields of view or may utilize encoded pulse streams so individual received packets can be extracted from the frame buffers and analyzed both spatially and over time.

LiDAR systems in accordance with various embodiments of the invention may use a multi-bit sequence of emitter pulses for each emitter/detector cycle. The multi-bit sequence is locally unique to each emitter, wherein the bit sequence differs from the bit sequences for emitters whose coincident axis/vectors are in close proximity. By selecting locally unique bit patterns for each emitter, the interference from other emitters and other similar LiDAR devices is dramatically reduced. The use of multi-bit emitter sequences may also result in reduced interference from non-LiDAR devices that are transmitting or reflecting energy at the target detector wavelength. For a more detailed description of multi-bit sequence techniques applied to pulses in a LiDAR system in accordance with these embodiments, reference is made to U.S. application Ser. No. 14/078,001, filed Nov. 12, 2013, the disclosure of which is hereby incorporated by reference (except for any claims or express definitions). Various embodiments of devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A LiDAR (light detection and ranging) system comprising:
   an emitter that emits a series of multiple emitted light packets over a field of view that is in motion relative to the emitter, each emitted light packet emitted for a cycle duration and including a plurality of light pulses;
   a detector array having an array of detectors configured to cover the field of view and sample an incoming retroreflected signal portion of an emitted light packet at a pre-determined sampling frequency that generates at least two samples corresponding to the cycle duration of the emitted light packet that are stored in a frame buffer;
   a processing system configured to analyze the samples from the detector array and detect any objects within the field of view using at least a volumetric analysis of the at least two samples from each detector in the array of detectors corresponding to the incoming retroreflected signal portion of each emitted light packet, the volumetric analysis including an analysis of the frame buffer that is performed for multiple samples within that frame buffer such that there are multiple periodic samples that are evaluated to reconstruct and analyze the reflected light energy based on a multi-bit intensity value for each detector in the detector array for a given cycle.

2. The LiDAR system of claim 1 wherein the emitter is configured for in situ calibration by emitting pre-determined calibration patterns of emitted light energy and measuring an intensity, a location and an angle of the reflected portion of the emitted light energy.

3. The LiDAR system of claim 1 wherein the emitter emits light energy as coherent electromagnetic laser energy.

4. The LiDAR system of claim 1 wherein the LiDAR system is carried by a vehicle, the field of view is a road scene captured from the vehicle, and the LiDAR system is utilized by an autonomous vehicle navigation system.

5. A LiDAR (light detection and ranging) system comprising:
   an emitter that emits a series of multiple emitted light packets over a field of view that is in motion relative to the emitter, each emitted light packet emitted for a cycle duration and including a plurality of light pulses;
   a detector array having an array of detectors configured to cover the field of view and sample an incoming retroreflected signal portion of an emitted light packet at a pre-determined sampling frequency that generates at least two samples corresponding to the cycle duration of the emitted light packet;
   a processing system configured to analyze the samples from the detector array and detect any objects within the field of view using at least a volumetric analysis of the at least two samples from each detector in the array of detectors corresponding to the incoming retroreflected signal portion of each emitted light packet,
   wherein the emitter generates an emitted beam that is characterized to determine an intensity of the emitted beam throughout an entire cross section of the emitted beam and wherein the processing system utilizes the intensity of the emitted beam to differentiate light energy patterns and resolve between emitted and reflected light energy patterns.

6. A LiDAR (light detection and ranging) system comprising:
an emitter that emits a series of multiple emitted light packets over a field of view that is in motion relative to the emitter, each emitted light packet emitted for a cycle duration;
a detector array having an array of detectors configured to cover the field of view and sample an incoming retroreflected signal portion of an emitted light packet at a pre-determined sampling frequency that generates at least two samples corresponding to the cycle duration of the emitted light packet that are stored in a frame buffer, wherein each detector in the detector array has a unique angle through which the retroreflected signal portion of each emitted light packet is received;
a processing system configured to analyze the samples from the detector array and detect any objects within the field of view using at least a volumetric analysis of the at least two samples from each detector in the array of detectors corresponding to the incoming retroreflected signal portion of each emitted light packet, the volumetric analysis including an analysis of the frame buffer that is performed for multiple samples within that frame buffer such that there are multiple periodic samples that are evaluated to reconstruct and analyze the reflected light energy based on a multi-bit intensity value for each detector in the detector array for a given cycle.

7. The LiDAR system of claim 6 wherein the LiDAR system is carried by a vehicle, the field of view is a road scene captured from the vehicle, and the LiDAR system is utilized by an autonomous vehicle navigation system.

* * * * *